(12) United States Patent
Jon et al.

(10) Patent No.: US 10,509,790 B2
(45) Date of Patent: Dec. 17, 2019

(54) ELECTRONIC MESSAGE SEARCHING

(71) Applicant: Apple Inc., Cupertino, CA (US)

(72) Inventors: Tiffany S. Jon, Sunnyvale, CA (US); Lawrence Y. Yang, San Francisco, CA (US); Patrick L. Coffman, San Francisco, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 565 days.

(21) Appl. No.: 14/860,624

(22) Filed: Sep. 21, 2015

(65) Prior Publication Data

US 2016/0357752 A1 Dec. 8, 2016

Related U.S. Application Data

(60) Provisional application No. 62/172,161, filed on Jun. 7, 2015.

(51) Int. Cl.
| | | |
|---|---|---|
| *G06F 17/30* | (2006.01) | |
| *G06F 16/2457* | (2019.01) | |
| *G06F 3/0484* | (2013.01) | |
| *G06F 16/248* | (2019.01) | |

(52) U.S. Cl.
CPC ...... *G06F 16/24578* (2019.01); *G06F 3/0484* (2013.01); *G06F 16/248* (2019.01)

(58) Field of Classification Search
CPC .............. G06F 17/3053; G06F 3/0484; G06F 17/30554; G06F 17/30696; G06F 3/0488; G06F 3/0481; G06F 16/24578; G06F 16/248; G06F 16/338; H04L 51/22; H04M 1/72552; H04M 2250/22
USPC ......................................................... 707/725
See application file for complete search history.

(56) References Cited

U.S. PATENT DOCUMENTS

| | | | | |
|---|---|---|---|---|
| 8,627,195 | B1 * | 1/2014 | Hayden ............. | G06F 17/30873 715/229 |
| 8,700,633 | B1 * | 4/2014 | Murphy ............ | G06F 17/30241 707/740 |
| 8,874,555 | B1 * | 10/2014 | Kim .................. | G06F 17/30864 707/723 |
| 8,909,655 | B1 * | 12/2014 | McDonnell ....... | G06F 17/30241 707/748 |
| 2004/0216045 | A1 * | 10/2004 | Martin ..................... | G06F 8/10 715/255 |
| 2007/0005587 | A1 * | 1/2007 | Johnson ............. | G06F 17/3053 |

(Continued)

*Primary Examiner* — Shiow-Jy Fan
(74) *Attorney, Agent, or Firm* — Dentons US LLP

(57) ABSTRACT

The present disclosure generally relates to electronic message searching. An electronic device receives a request that includes a search term. The device can initiate a search based on the search term to produce a plurality of search results of a plurality of time periods that do not overlap. The device determine whether there are more than a predetermined number of search results for a given time period. If the predetermined number of results is exceeded, the device can display a search result group. If the predetermined number of results is not exceeded, the device can include the search results, corresponding to the given time period, in search results of a different time period. The device can also provide various affordances for narrowing or expanding the scope of the electronic message search.

42 Claims, 23 Drawing Sheets

(56) References Cited

U.S. PATENT DOCUMENTS

| | | | |
|---|---|---|---|
| 2007/0201539 A1* | 8/2007 | Yu | H04B 1/7097 |
| | | | 375/148 |
| 2008/0055263 A1* | 3/2008 | Lemay | H04M 1/72522 |
| | | | 345/173 |
| 2008/0057926 A1* | 3/2008 | Forstall | G06F 3/0482 |
| | | | 455/415 |
| 2008/0094369 A1* | 4/2008 | Ganatra | G06F 3/04883 |
| | | | 345/173 |
| 2008/0155413 A1* | 6/2008 | Ubillos | G06F 3/0481 |
| | | | 715/716 |
| 2009/0182725 A1* | 7/2009 | Govani | G06F 17/30864 |
| 2012/0030569 A1* | 2/2012 | Migos | G06F 3/04845 |
| | | | 715/702 |
| 2012/0150831 A1* | 6/2012 | Sun | G06F 17/30867 |
| | | | 707/706 |
| 2013/0275899 A1* | 10/2013 | Schubert | G06F 3/0481 |
| | | | 715/765 |
| 2014/0025668 A1* | 1/2014 | Lin | G06F 17/30867 |
| | | | 707/723 |
| 2015/0213377 A1* | 7/2015 | Ito | G06Q 10/10 |
| | | | 705/5 |
| 2016/0266741 A1* | 9/2016 | Harada | G06F 17/30554 |

* cited by examiner

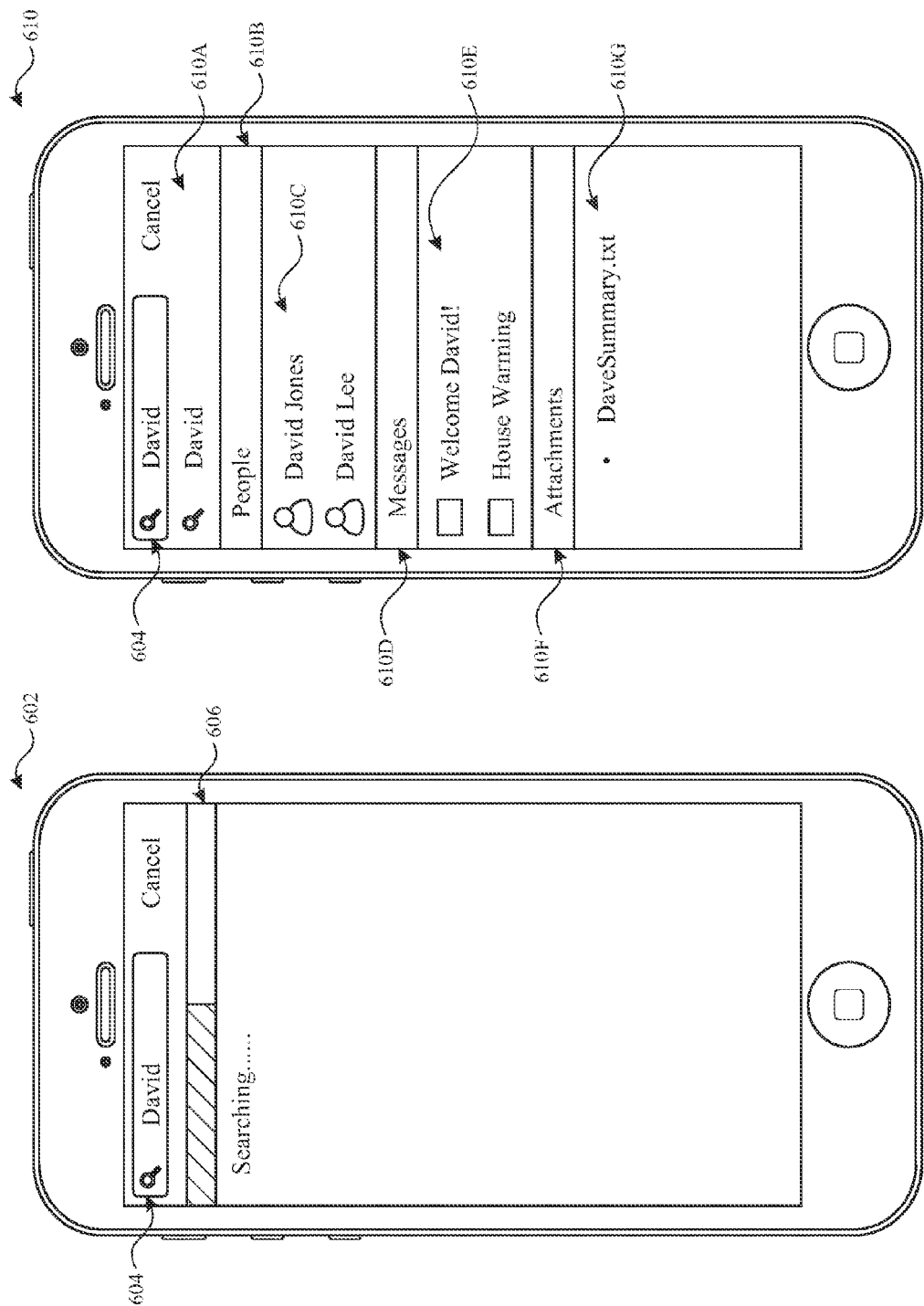

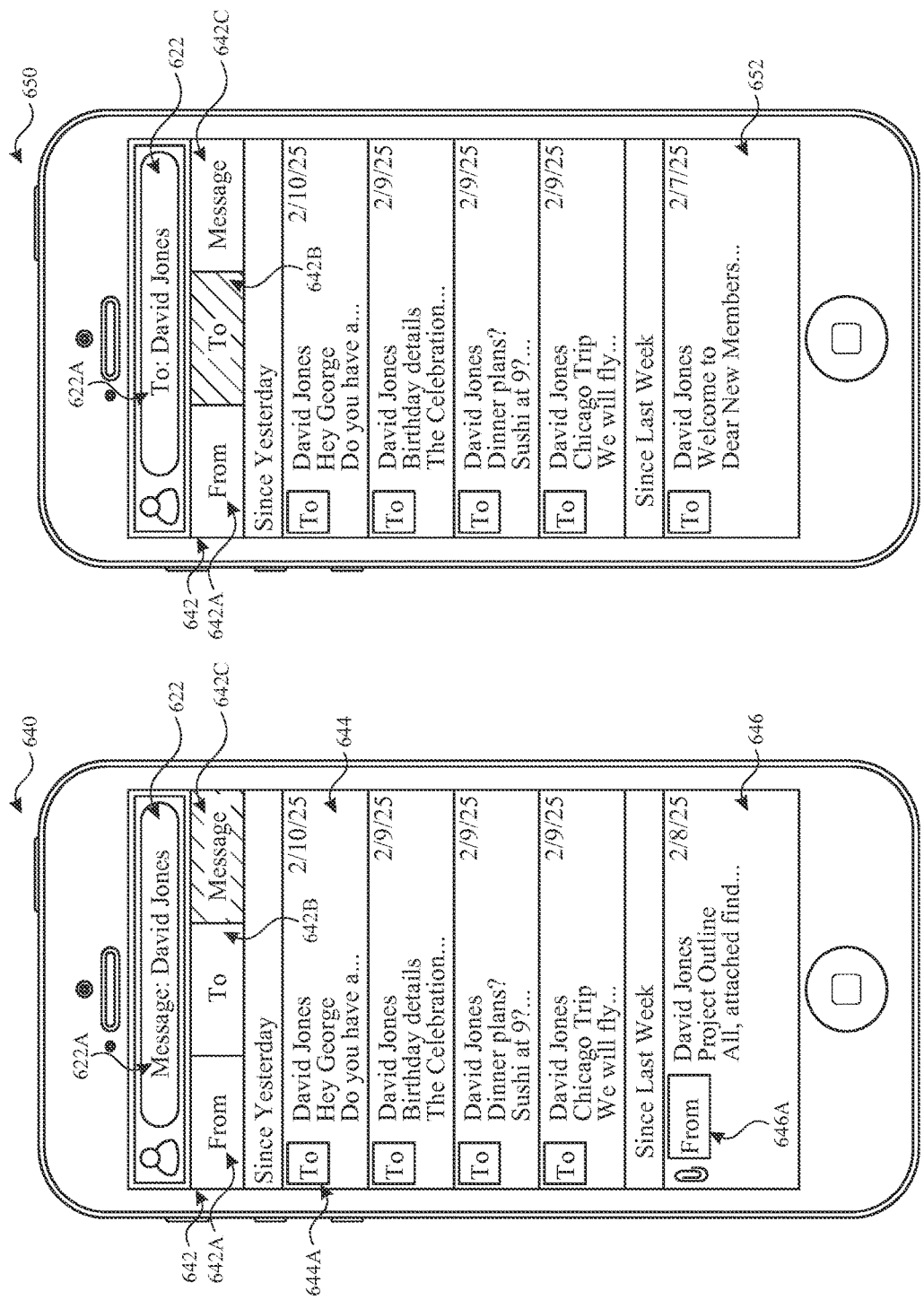

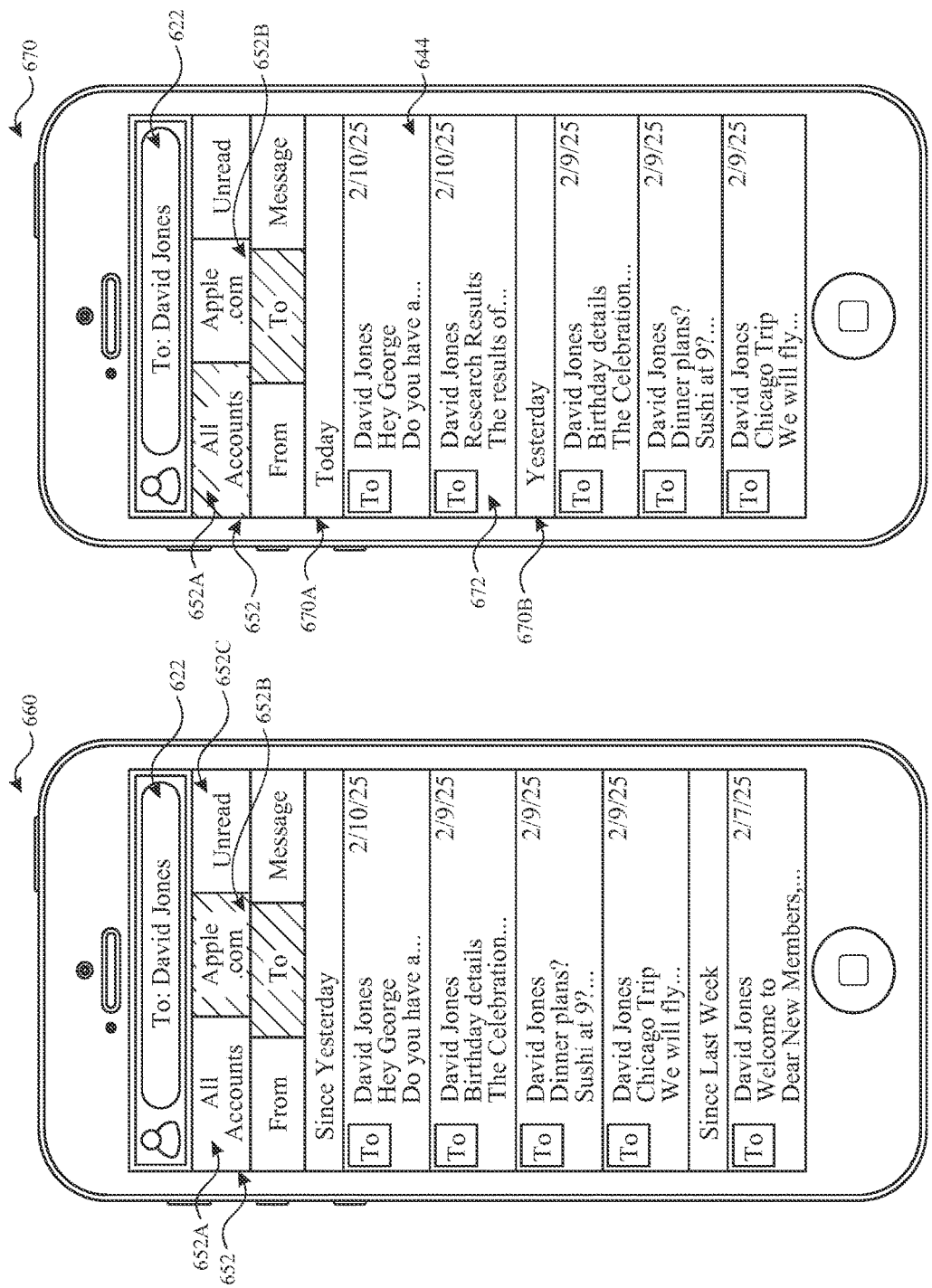

| Date | Subject |
|---|---|
| Tues Feb10 2025 | Hey George |
| Tues Feb10 2025 | Can you attend... |
| Tues Feb10 2025 | Hiking Pictures |
| Mon Feb9 2025 | Birthday details |
| Mon Feb9 2025 | Dinner plans? |
| Mon Feb9 2025 | Chicago Trip |
| Sun Feb8 2025 | Project Outline |
| Sat Feb7 2025 | Welcome to... |
| Fri Feb6 2025 | Sign-up List |
| Thur Feb5 2025 | Holiday Party! |
| Thur Feb5 2025 | Recommendation? |
| Sun Feb1 2025 | Interesting Article |
| Fri Jan30 2025 | Membership Dues |
| Fri Jan16 2025 | Our Meeting on... |
| Sat Jan3 2025 | Lost sunglasses? |
| Fri Dec16 2024 | Check out my blog! |
| Thur Dec15 2024 | Epic Bike Ride |
| Wed Dec14 2024 | Book Club |
| Thur Nov13 2024 | Concert Tickets |
| Wed Nov12 2024 | New Baby! |
| Tues Nov11 2024 | Video Link |

| | |
|---|---|
| Today | |
| Tues Feb 10 2025 | Hey George |
| Tues Feb 10 2025 | Can you attend... |
| Tues Feb 10 2025 | Hiking Pictures |
| Yesterday | |
| Mon Feb 9 2025 | Birthday details |
| Mon Feb 9 2025 | Dinner plans? |
| Mon Feb 9 2025 | Chicago Trip |
| Since Last Week | |
| Sun Feb 8 2025 | Project Outline |
| Sat Feb 7 2025 | Welcome to... |
| Fri Feb 6 2025 | Sign-up List |
| Thur Feb 5 2025 | Holiday Party! |
| Thur Feb 5 2025 | Recommendation? |
| Sun Feb 1 2025 | Interesting Article |
| January 2025 | |
| Fri Jan 30 2025 | Membership Dues |
| Fri Jan 16 2025 | Our Meeting on... |
| Sat Jan 3 2025 | Lost sunglasses? |
| December 2024 | |
| Fri Dec 16 2024 | Check out my blog! |
| Thur Dec 15 2024 | Epic Bike Ride |
| Wed Dec 14 2024 | Book Club |
| November 2024 | |
| Thur Nov 13 2024 | Concert Tickets |
| Wed Nov 12 2024 | New Baby! |
| Tues Nov 11 2024 | Video Link |

FIG. 7A

| Date | Subject |
|---|---|
| Tues Feb 10 2025 | Hey George |
| Mon Feb 9 2025 | Birthday details |
| Mon Feb 9 2025 | Dinner plans? |
| Mon Feb 9 2025 | Chicago Trip |
| Sun Feb 8 2025 | Project Outline |
| Sat Feb 7 2025 | Welcome to... |
| Fri Feb 6 2025 | Sign-up List |
| Thur Feb 5 2025 | Holiday Party! |
| Thur Feb 5 2025 | Recommendation? |
| Sun Feb 1 2025 | Interesting Article |
| Fri Jan 30 2025 | Membership Dues |
| Fri Jan 16 2025 | Our Meeting on... |
| Sat Jan 3 2025 | Lost sunglasses? |
| Fri Dec 16 2024 | Check out my blog! |
| Thur Dec 15 2024 | Epic Bike Ride |
| Wed Dec 14 2024 | Book Club |
| Thur Nov 13 2024 | Concert Tickets |
| Wed Nov 12 2024 | New Baby! |
| Tues Nov 11 2024 | Video Link |

720

| | |
|---|---|
| Since Yesterday | |
| Tues Feb 10 2025 | Hey George |
| Mon Feb 9 2025 | Birthday details |
| Mon Feb 9 2025 | Dinner plans? |
| Mon Feb 9 2025 | Chicago Trip |
| Since Last Week | |
| Sun Feb 8 2025 | Project Outline |
| Sat Feb 7 2025 | Welcome to... |
| Fri Feb 6 2025 | Sign-up List |
| Thur Feb 5 2025 | Holiday Party! |
| Thur Feb 5 2025 | Recommendation? |
| Sun Feb 1 2025 | Interesting Article |
| January 2025 | |
| Fri Jan 30 2025 | Membership Dues |
| Fri Jan 16 2025 | Our Meeting on... |
| Sat Jan 3 2025 | Lost sunglasses? |
| December 2024 | |
| Fri Dec 16 2024 | Check out my blog! |
| Thur Dec 15 2024 | Epic Bike Ride |
| Wed Dec 14 2024 | Book Club |
| November 2024 | |
| Thur Nov 13 2024 | Concert Tickets |
| Wed Nov 12 2024 | New Baby! |
| Tues Nov 11 2024 | Video Link |

| Date | Subject |
|---|---|
| Tues Feb 10 2025 | Hey George |
| Tues Feb 10 2025 | Can you attend... |
| Tues Feb 10 2025 | Hiking Pictures |
| Mon Feb 9 2025 | Birthday details |
| Sun Feb 8 2025 | Project Outline |
| Sat Feb 7 2025 | Welcome to... |
| Fri Feb 6 2025 | Sign-up List |
| Thur Feb 5 2025 | Holiday Party! |
| Thur Feb 5 2025 | Recommendation? |
| Sun Feb 1 2025 | Interesting Article |
| Fri Jan 30 2025 | Membership Dues |
| Fri Jan 16 2025 | Our Meeting on... |
| Sat Jan 3 2025 | Lost sunglasses? |
| Fri Dec 16 2024 | Check out my blog! |
| Thur Dec 15 2024 | Epic Bike Ride |
| Wed Dec 14 2024 | Book Club |
| Thur Nov 13 2024 | Concert Tickets |
| Wed Nov 12 2024 | New Baby! |
| Tues Nov 11 2024 | Video Link |

730

| | |
|---|---|
| Today | |
| Tues Feb 10 2025 | Hey George |
| Tues Feb 10 2025 | Can you attend... |
| Tues Feb 10 2025 | Hiking Pictures |
| Since Last Week | |
| Mon Feb 9 2025 | Birthday details |
| Sun Feb 8 2025 | Project Outline |
| Sat Feb 7 2025 | Welcome to... |
| Fri Feb 6 2025 | Sign-up List |
| Thur Feb 5 2025 | Holiday Party! |
| Thur Feb 5 2025 | Recommendation? |
| Sun Feb 1 2025 | Interesting Article |
| January 2025 | |
| Fri Jan 30 2025 | Membership Dues |
| Fri Jan 16 2025 | Our Meeting on... |
| Sat Jan 3 2025 | Lost sunglasses? |
| December 2024 | |
| Fri Dec 16 2024 | Check out my blog! |
| Thur Dec 15 2024 | Epic Bike Ride |
| Wed Dec 14 2024 | Book Club |
| November 2024 | |
| Thur Nov 13 2024 | Concert Tickets |
| Wed Nov 12 2024 | New Baby! |
| Tues Nov 11 2024 | Video Link |

830
Display, on the display, a first account selection affordance; receive an input corresponding to activation of the first account selection affordance; and in response to receiving the input corresponding to activation of the first account selection affordance, expand the search results to include search results based on a plurality of email accounts.

832
Prior to initiating the search, determining that the search term matches one or more persons; in response to determining that the search term matches one or more persons, display, on the display, one or more affordances corresponding to the one or more persons; receive an input corresponding to an activation of a first affordance of the one or more affordances; and in response to receiving the input corresponding to the activation of the first affordance of the one or more affordances, initiating the search.

834
In response to receiving the input corresponding to the activation of the first affordance of the one or more affordances, display, on the display, a second affordance indicating a search based on a person associated with the first affordance; receive an input corresponding to an activation of the second affordance; and in response to receiving the input corresponding to the activation of the second affordance, display, on the display, a first search narrowing affordance and a second search narrowing affordance.

836
Receive an input corresponding to an activation of the first search narrowing affordance; and in response to receiving the input corresponding to the activation of the first search narrowing affordance, update displayed search results to only include search results associated with emails that include the person as a sender.

*FIG. 8C*

ELECTRONIC MESSAGE SEARCHING

CROSS-REFERENCE TO RELATED APPLICATIONS

This application claims priority to U.S. Provisional Patent Application No. 62/172,161, entitled "ELECTRONIC MESSAGE SEARCHING," filed Jun. 7, 2015, the content of which is hereby incorporated by reference in its entirety for all purposes.

FIELD

The present disclosure relates generally to computer user interfaces, and more specifically to techniques for electronic message searching.

BACKGROUND

Modern electronic devices allow users to be more connected than ever to friends, colleagues and activities through the exchange of electronic messages (also referred to as "emails", "E-mails", or the like). However, searching through a collection of electronic messages on electronic devices can be burdensome. For example, the presentation of search results may be uncategorized or categorized in a non-intuitive manner. Further, modifying search parameters may require excessive amount of user input. As a result, users may have difficulty locating desired messages or may be presented with irrelevant or incomplete search results. This can create a frustrating user experience and lead to a loss in productivity.

Searching through electronic messages frequently uses a display of the electronic device. Extended use of the display due to unnecessary repetitive inputs or the inefficient presentation of search results will result in excessive battery usage.

BRIEF SUMMARY

Some techniques for searching electronic messages using electronic devices, however, are generally cumbersome and inefficient. For example, some existing techniques use a complex and time-consuming user interface, which may include uncategorized search results and require excessive user inputs to refine a search to the desired scope. Existing techniques require more time than necessary, wasting user time and device energy. This latter consideration is particularly important in battery-operated devices.

Accordingly, the present technique provides for electronic devices with faster, more efficient methods and interfaces for searching electronic messages. Such methods and interfaces optionally complement or replace other methods for searching electronic messages. Such methods and interfaces reduce the cognitive burden on a user and produce a more efficient human-machine interface. For battery-operated computing devices, such methods and interfaces conserve power and increase the time between battery charges. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a method of searching electronic messages comprises: at an electronic device with a display: receiving a request that includes a search term; initiating a search based on the search term to produce a plurality of search results of a plurality of time periods, wherein time periods of the plurality of time periods do not overlap; and for each respective time period of at least two time periods of the plurality of time periods: determining whether there are more than a predetermined number of search results for the respective time period; in accordance with a determination that there are more than the predetermined number of search results for the respective time period, displaying, on the display, a respective search result group that includes at least some of the search results for the respective time period; and in accordance with a determination that there are not more than the predetermined number of search results for the respective time period, including the search results of the respective time period in search results of a different time period.

In some embodiments, an electronic device comprises: a display; one or more processors; memory; and one or more programs, wherein the one or more programs are stored in the memory and configured to be executed by the one or more processors, the one or more programs including instructions for: receiving a request that includes a search term; initiating a search based on the search term to produce a plurality of search results of a plurality of time periods, wherein time periods of the plurality of time periods do not overlap; and for each respective time period of at least two time periods of the plurality of time periods: determining whether there are more than a predetermined number of search results for the respective time period; in accordance with a determination that there are more than the predetermined number of search results for the respective time period, displaying, on the display, a respective search result group that includes at least some of the search results for the respective time period; and in accordance with a determination that there are not more than the predetermined number of search results for the respective time period, including the search results of the respective time period in search results of a different time period.

In some embodiments, a non-transitory computer-readable storage medium storing one or more programs, the one or more programs comprising instructions, which, when executed by an electronic device with a display, cause the device to: receive a request that includes a search term; initiate a search based on the search term to produce a plurality of search results of a plurality of time periods, wherein time periods of the plurality of time periods do not overlap; and for each respective time period of at least two time periods of the plurality of time periods: determine whether there are more than a predetermined number of search results for the respective time period; in accordance with a determination that there are more than the predetermined number of search results for the respective time period, enable display, on the display, of a respective search result group that includes at least some of the search results for the respective time period; and in accordance with a determination that there are not more than the predetermined number of search results for the respective time period, include the search results of the respective time period in search results of a different time period.

In some embodiments, a transitory computer-readable medium storing one or more programs, the one or more programs comprising instructions, which, when executed by an electronic device with a display, cause the device to: receive a request that includes a search term; initiate a search based on the search term to produce a plurality of search results of a plurality of time periods, wherein time periods of the plurality of time periods do not overlap; and for each respective time period of at least two time periods of the plurality of time periods: determine whether there are more than a predetermined number of search results for the respective time period; in accordance with a determination that there are more than the predetermined number of search results for the respective time period, enable display, on the display, of a respective search result group that includes at least some of the search results for the respective time period; and in accordance with a determination that there are not more than the predetermined number of search results for the respective time period, include the search results of the respective time period in search results of a different time period.

In some embodiments, a system comprises: a display; means for receiving a request that includes a search term; means for initiating a search based on the search term to produce a plurality of search results of a plurality of time periods, wherein time periods of the plurality of time periods do not overlap; and means, for each respective time period of at least two time periods of the plurality of time periods, for: determining whether there are more than a predetermined number of search results for the respective time period; in accordance with a determination that there are more than the predetermined number of search results for the respective time period, displaying a respective search result group that includes at least some of the search results for the respective time period; and in accordance with a determination that there are not more than the predetermined number of search results for the respective time period, including the search results of the respective time period in search results of a different time period.

In some embodiments, an electronic device comprises: a display unit configured to display graphical objects; and a processing unit, coupled to the display unit, the processing unit configured to: receive a request that includes a search term; initiate a search based on the search term to produce a plurality of search results of a plurality of time periods, wherein time periods of the plurality of time periods do not overlap; and for each respective time period of at least two time periods of the plurality of time periods: determine whether there are more than a predetermined number of search results for the respective time period; in accordance with a determination that there are more than the predetermined number of search results for the respective time period, enable display, on the display unit, of a respective search result group that includes at least some of the search results for the respective time period; and in accordance with a determination that there are not more than the predetermined number of search results for the respective time period, include the search results of the respective time period in search results of a different time period.

Thus, devices are provided with faster, more efficient methods and interfaces for searching electronic messages, thereby increasing the effectiveness, efficiency, and user satisfaction with such devices. Such methods and interfaces may complement or replace other methods for searching electronic messages.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6I illustrate exemplary user interfaces for searching electronic messages in accordance with some embodiments.

FIGS. 7A-7F illustrate exemplary user interfaces and associated uncategorized and categorized electronic message lists.

FIGS. 8A-8C illustrate a flow diagram of an exemplary process for searching electronic messages in accordance with some embodiments.

DESCRIPTION OF EMBODIMENTS

Figure 1A:
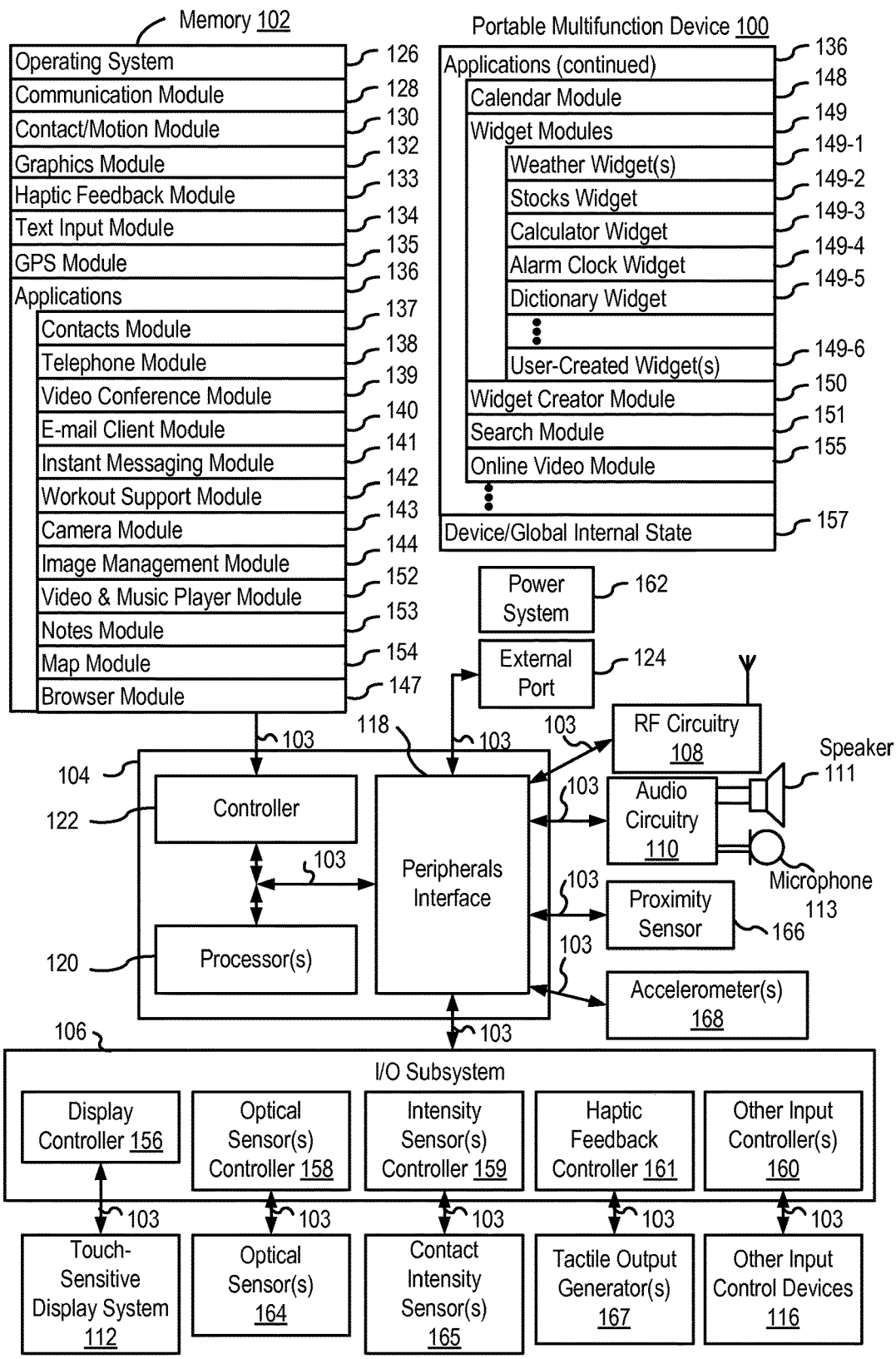
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

As noted above, searching electronic messages using an electronic device can be generally cumbersome and inefficient. For example, some existing techniques use a complex and time-consuming user interface, which may include uncategorized search results and require excessive or unintuitive user inputs to refine a search to the desired scope. The additional cognitive burden of reviewing uncategorized search results, coupled with the excessive user inputs required, can lead to a frustrating user experience and loss in productivity.

In some embodiments of the present disclosure, this problem is addressed by providing an electronic device that provides electronic message search results, grouped under intuitive category headings according to a date associated with each message. For example, the device determines if the number of messages in a group of messages exceeds a predetermined threshold. If the number of messages in the group of messages does exceed the predetermined threshold, the device assigns and displays a category heading for the group. If the number of messages does not exceed the threshold, the device includes the messages in a different group of messages; if the combination results in a number of messages that exceeds the predetermined threshold, the device assigns and displays a category heading for the combined group. The device also provides intuitive user interfaces for narrowing or expanding an electronic message search that require minimal amounts of user input. In this manner, the user of an electronic device may search electronic messages across one or more accounts, remotely or locally, with minimal effort, which can save the user time, enhance productivity, and produce a more efficient human-machine interface.

Below, FIGS. 1A-1B, 2, 3, 4A-4B, and 5A-5B provide a description of exemplary devices for performing the techniques for searching electronic messages. FIGS. 6A-6I illustrate exemplary user interfaces for searching electronic messages. FIGS. 7A-7F illustrate exemplary user interfaces and associated uncategorized and categorized electronic message lists, categorized according to an exemplary algorithm. FIG. 8 is a flow diagram illustrating methods of searching electronic messages in accordance with some embodiments. The user interfaces in FIGS. 6A-6I and FIGS. 7A-7F are used to illustrate the processes described below, including the processes in FIG. 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
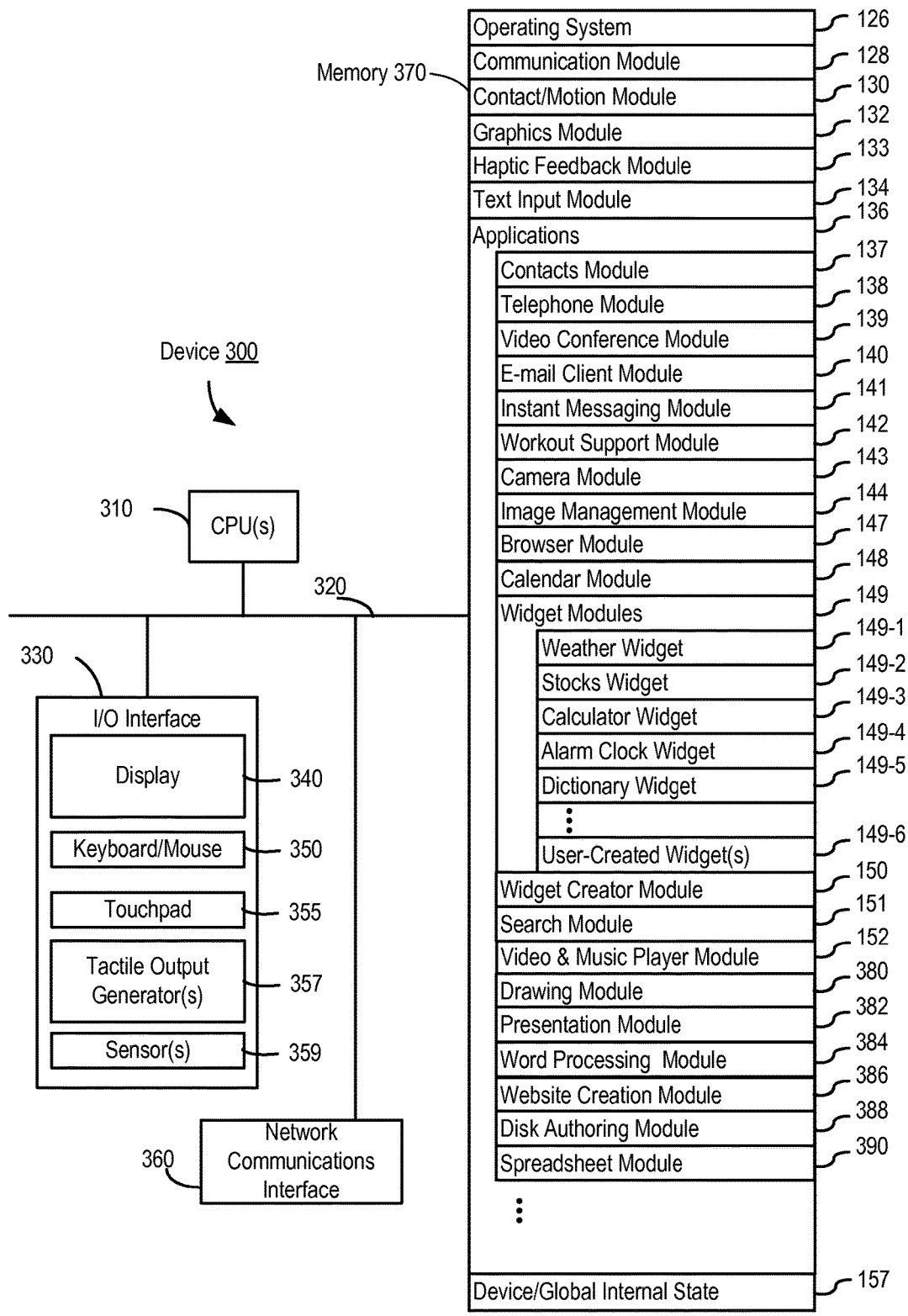
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
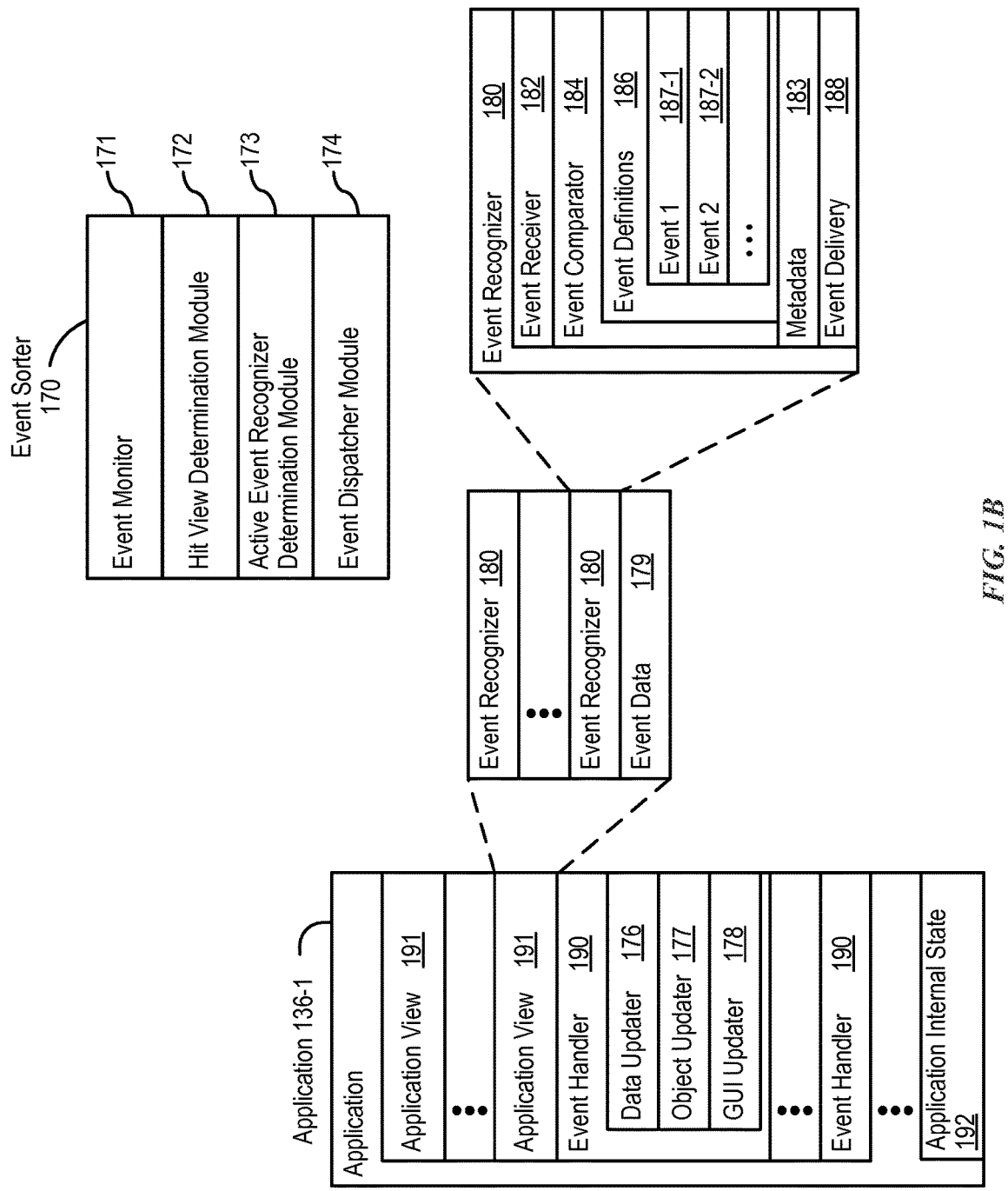
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
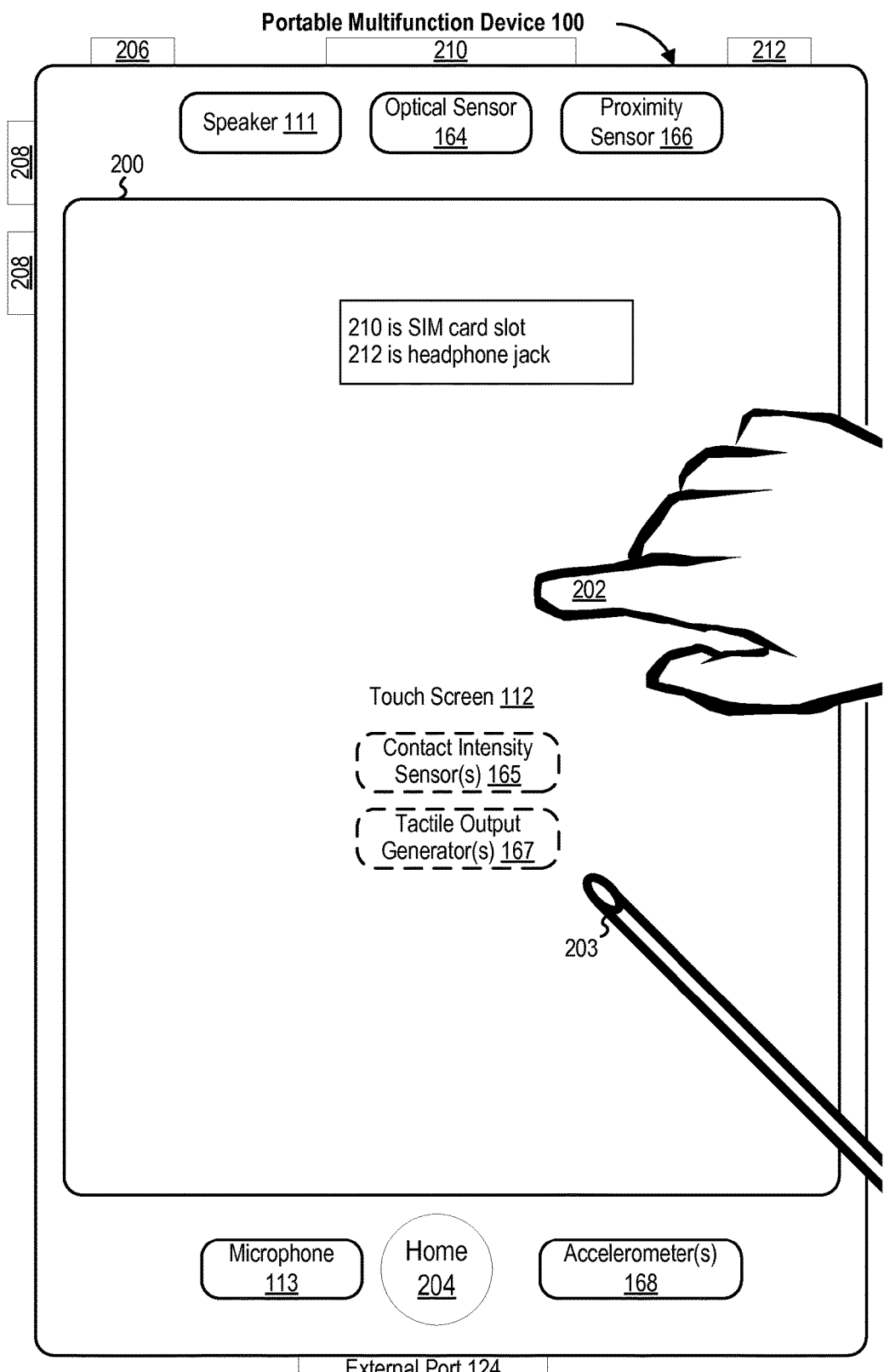
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
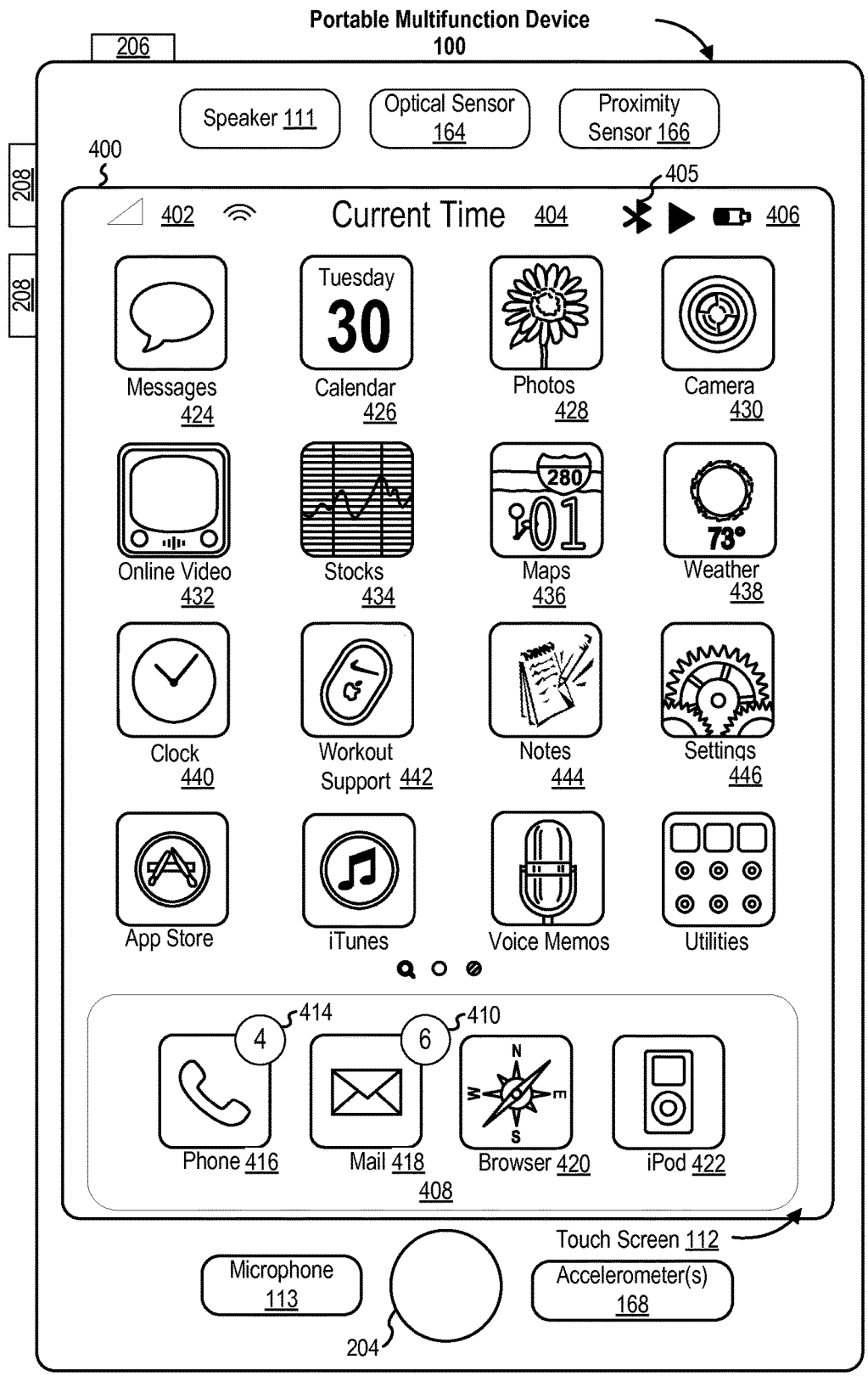
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
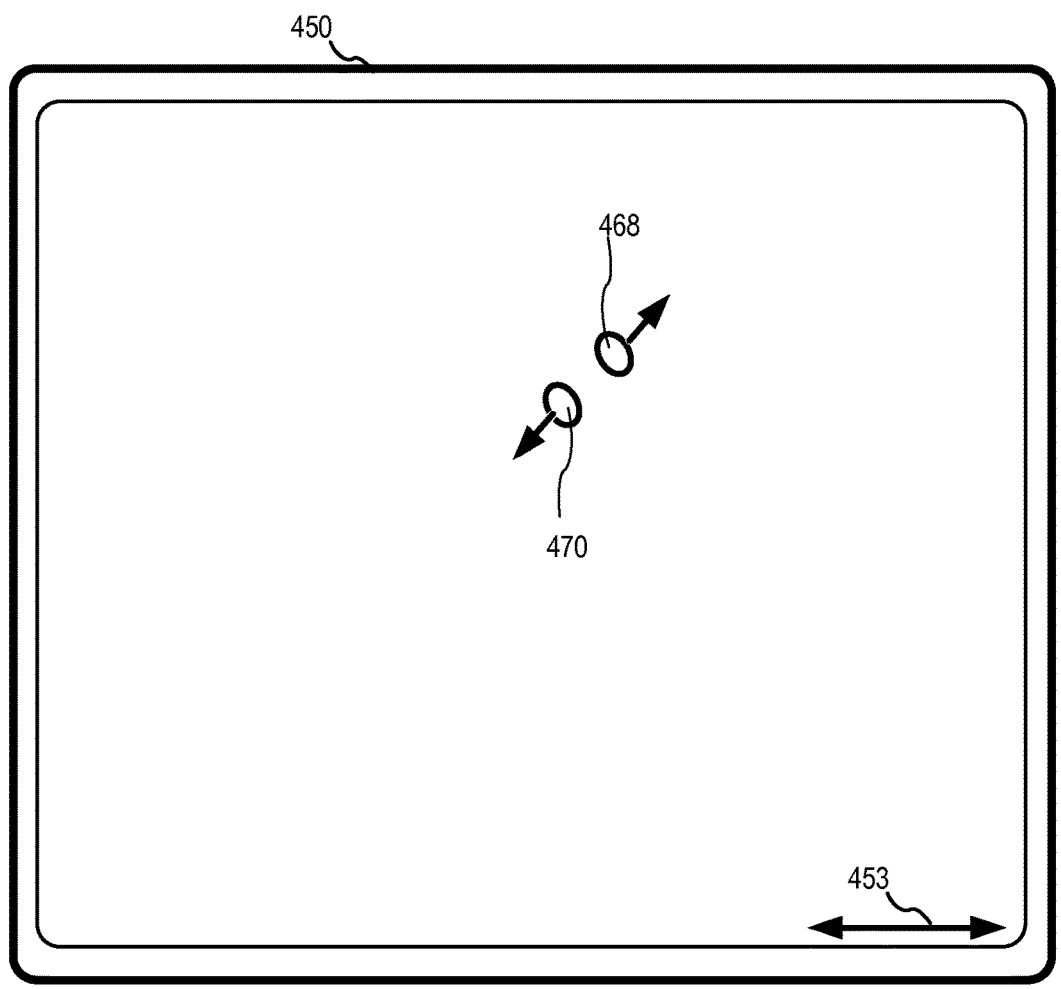
FIG. 4B illustrates an exemplary user interface for a multifunction device with a touch-sensitive surface that is separate from the display in accordance with some embodiments.
Figure 4B:
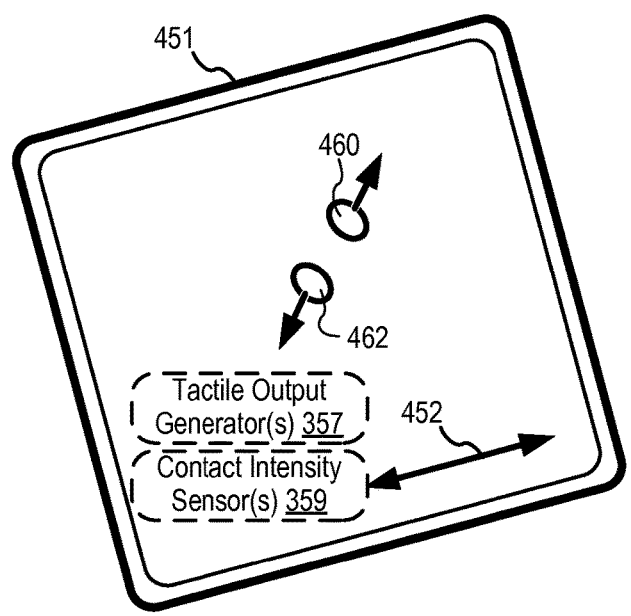

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
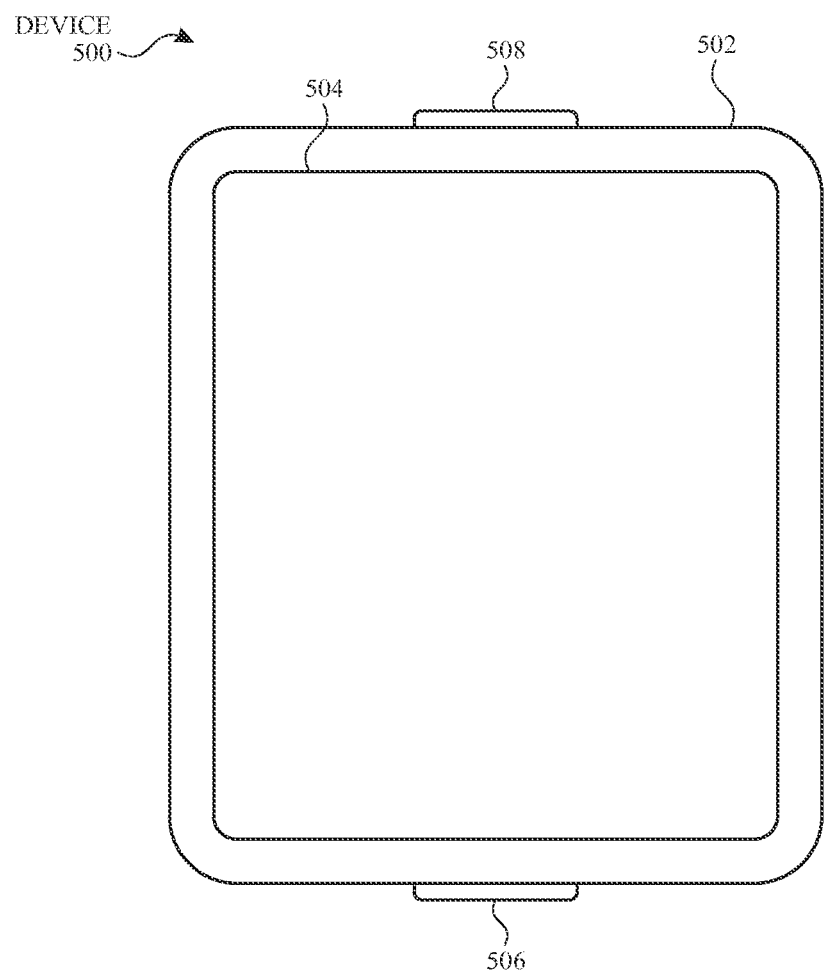
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
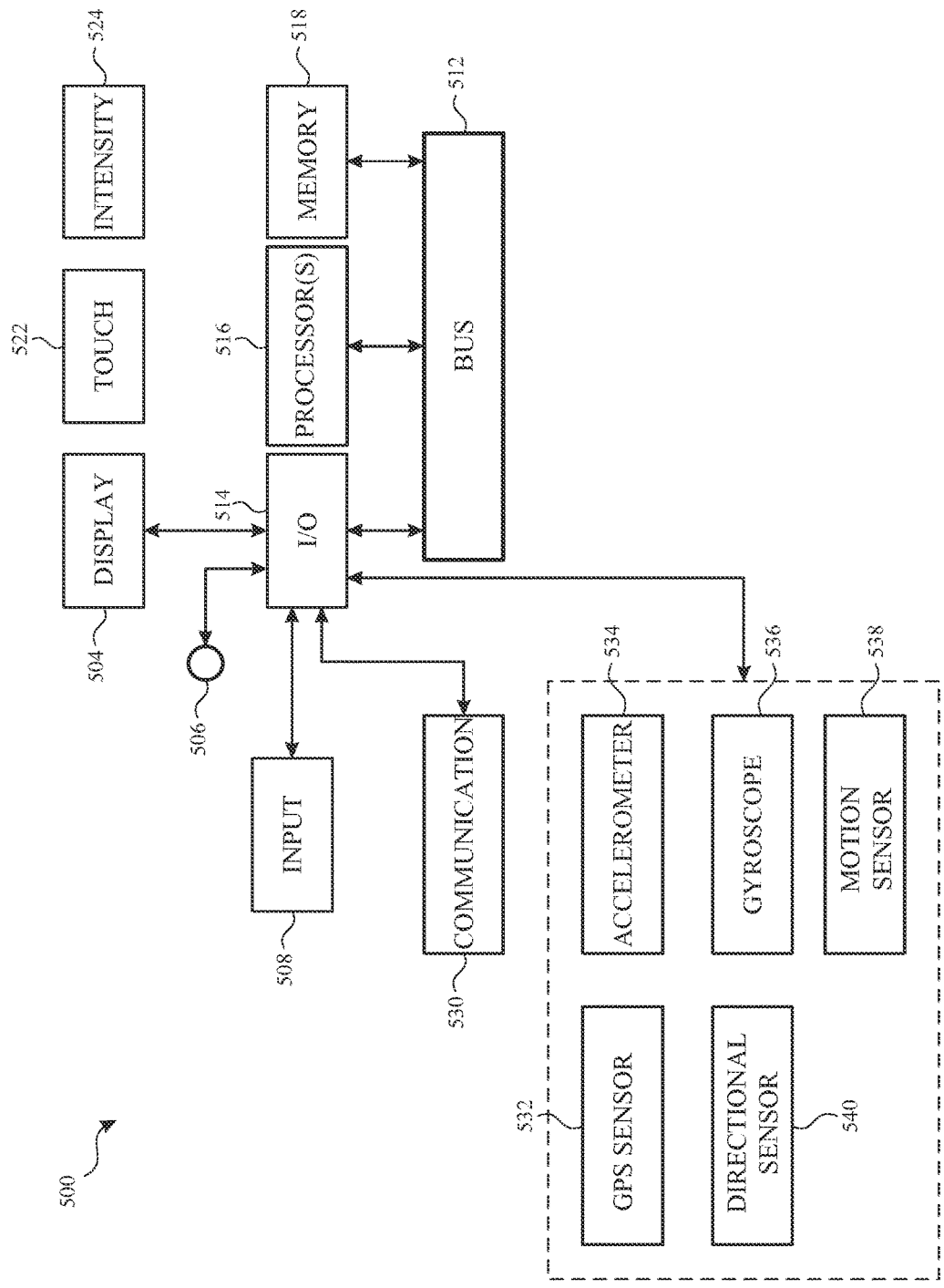
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described below, including process 800 (FIG. 8). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6I illustrate exemplary user interfaces for electronic message searching in accordance with some embodiments. The user interfaces of FIGS. 6A-6I are used to illustrate the processes described below, including the processes in FIG. 8. The user interfaces of FIGS. 6A-6I and the processes in FIG. 8 can be carried out on an electronic device that includes some or all of the features described with respect to devices 100, 300, and/or 500

In some embodiments, as discussed in more detail below, an electronic device receives a request that includes a search term. The electronic device then initiates a search based on the search term to produce a plurality of search results of a plurality of time periods, wherein time periods of the plurality of time periods do not overlap. For each respective time period of at least two time periods of the plurality of time periods, the electronic device determines whether there are more than a predetermined number of search results for the respective time period. In accordance with a determination that there are more than the predetermined number of search results for the respective time period, the electronic device displays, on the display, a respective search result group that includes at least some of the search results for the respective time period. In accordance with a determination that there are not more than the predetermined number of search results for the respective time period, the electronic device includes the search results of the respective time period in search results of a different time period.

FIG. 6A illustrates an exemplary user interface 602 for electronic message searching. The electronic device receives a request that includes a search term. User interface 602 includes search field 604, which includes an illustrative search term. In the example depicted in FIG. 6A, the electronic device has received the search term "David".

FIG. 6B illustrates an exemplary user interface 610 for selecting a search type. In accordance with some embodiments, prior to initiating the search, the electronic device determines that the search term matches one or more persons (e.g., email recipients or email senders). In response to determining that the search term matches one or more persons, the electronic device displays one or more affordances (e.g., 610C) corresponding to the one or more persons. For example, in FIG. 6B, the electronic device displays two affordances corresponding to matching persons under heading 610B: David Jones and David Lee. The electronic device receives an input corresponding to an activation of a first affordance (e.g., 610C) of the one or more affordances. In this example, the electronic device receives input corresponding to affordance 610C, associated with person David Jones. Thus, a search for a person matching the search term is initiated in a convenient and intuitive manner.

In some embodiments, after the electronic device receives the search term "David", the device displays user interface 610 of FIG. 6B. User interface 610 illustrates a search-type selection interface, at which the electronic device receives user input corresponding to selection of a message search-type. The types of searches available at user interface 610 depend on the search terms of the request, for example. Search-types include a keyword-type search (activated by affordance 610A), a person-type search (e.g., by contact) (activated by affordance 610C), a message-type search (e.g., by message content) (activated by affordance 610E), or an attachment-type search (e.g., by message attachment) (activated by affordance 610G). Persons (or entities) matching the search term are listed under heading 610B. Messages matching the search term are listed under messages heading 610D. Message attachments matching the search term are listed under attachments heading 610F. The device receives, for example, user input corresponding to a selection (e.g., activation) of affordance 610C, associated with person "David Jones".

Figure 6D:
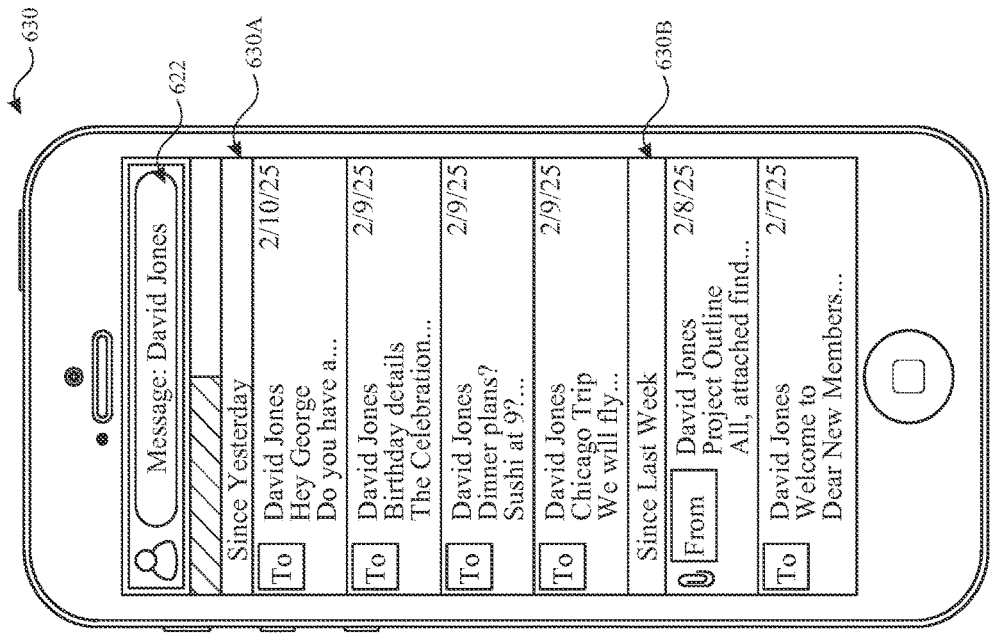
Figure 6C:
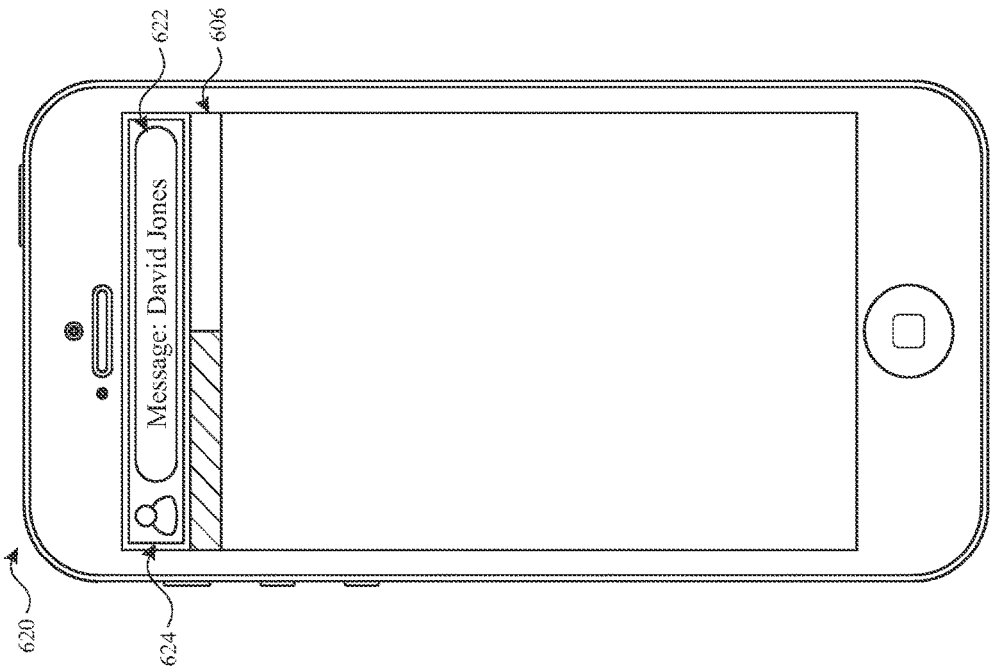

FIG. 6C illustrates an exemplary user interface 620 for searching electronic messages. The electronic device initiates a search based on the search term to produce a plurality of search results of a plurality of time periods, wherein time periods of the plurality of time periods do not overlap. For example, initiating the search produces results based on messages that are stored locally (e.g., at the electronic device), remotely, or both. For example, the device searches (or receives search results regarding) emails stored on local memory, remote memory, or a combination of both. The progress indicator 606 of FIG. 6C indicates the progress of the search; alternatively, or in addition, the progress indicator 606 of FIG. 6C indicates that the search is still being conducted.

In accordance with some embodiments, in response to receiving the input corresponding to the activation of the first affordance (e.g., 610A-610G) of the one or more affordances, the electronic device initiates the search. For example, the initiated search uses information associated with a person (e.g., David Jones) associated with the first affordance (e.g., 610A), such as one or more email addresses of the person. In response to detecting the selection of affordance 610C of user interface 610, the device displays user interface 620, which indicates that a person-type search is being conducted by the electronic device. In the example shown in user interface 620, a search is initiated based on the search term "David Jones". Contact affordance 622 identifies the searched-for person David Jones. Contact affordance 622 optionally takes on the appearance of an icon, or other visual representation, that indicates to a user that it is not an editable input field, but rather a selectable affordance. For example, contact affordance 622 takes on the appearance of a grey-colored capsule (e.g., a pill shape). Icon 624 indicates that the search conducted is a person-type search (e.g., selection was received of a person listed under people heading 610B of user interface 610).

FIG. 6D illustrates an exemplary user interface 630 for viewing the results of a person-type search. In the example shown, the results displayed under headings 630A and 630B are from a person-type search for person David Jones. As discussed above, initiating a search based on the search term produces a plurality of search results (e.g., representing electronic messages) of a plurality of time periods. For each respective time period of at least two time periods of the plurality of time periods, the electronic device determines whether there are more than a predetermined number of search results for the respective time period. For example, the electronic device determines whether there is more than one email matching the search term in the respective time period. In accordance with a determination that there are more than the predetermined number of search results for the respective time period, the electronic device displays a respective search result group that includes at least some of (or all of) the search results for the respective time period. For example, the respective search result group (category) includes a search result heading, such as 630A and 630B, describing the respective time period of the respective message affordances. A respective message affordance, when activated, causes display of a corresponding email. In accordance with a determination that there are not more than the predetermined number of search results for the respective time period, the electronic device includes (e.g., groups and displays with) the search results of the respective time period in search results of a different time period (e.g., the next time period). In some examples, a search result heading (e.g., category heading) is not displayed for a time period corresponding to search results that have been included with search results of a different time period.

In particular, the search results of the user interfaces of FIGS. 6D-6G correspond to the messages of message list 720 and categorized message list 722 of FIG. 7C. The user interfaces depicted in FIGS. 6D-6G illustrate exemplary user interfaces for displaying, reviewing, and receiving user input interacting with search results in accordance with some embodiments.

As seen in exemplary user interface 630 of FIG. 6D, the email to David Jones titled "Hey George" has a message date of Feb. 10, 2025 (i.e., Feb. 10, 2025), which is the current date at the time the search is conducted, for example. However, in accordance with the determination that the time period of "Today" does not contain more than one (the threshold or predetermined number for the embodiment of FIG. 6D) of search results, the email titled "Hey George" is included in the search results of the different time period "Yesterday", and no heading for the period "Today" is displayed. In accordance with some embodiments, the search result heading 630A for the search result group of messages from today and yesterday reads "Since Yesterday" to inform a user that the messages listed under the search result heading 630A include messages from more than one time period. Similarly, the email from David Jones titled "Project Outline" dated Feb. 8, 2025 is included under the search result heading 630B, which reads "Since Last Week". For example, if the current week is the calendar week of Sunday, February 8 through Saturday, Feb. 14, 2025, and the last week is the calendar week of Sunday, Feb. 1, 2025 through Saturday, Feb. 7, 2025, the search results grouped under "Since Last Week" include messages from both this week (e.g., the message titled "Project Outline" dated Feb. 8, 2025) and from last week (e.g., the message titled "Welcome to . . . " dated Feb. 7, 2025). Accordingly, search result heading 630B includes the term "since" to indicate that the messages listed therein include messages from more than one time period (i.e., this week and last week).

Additional examples illustrating the above-described technique are illustrated in FIGS. 7A-7F and the accompanying descriptions.

Grouping messages that do not exceed a threshold number of messages under one heading provides more efficient use of the display of a device, which has a limited area within which search results can be displayed. For example, grouping of search results prevents a heading for "Today" from being displayed when only one message would be categorized within that group—an inefficient use of a heading and the area of a display. In some examples, fewer headings are displayed to conserve display space.

In accordance with some embodiments, in response to receiving the input corresponding to the activation of the first affordance (e.g., affordance 610C of user interface 610) of the one or more affordances, the electronic device displays a second affordance (e.g., a pill or capsule with the name of the person associated with the first affordance displayed inside the pill, such as contact affordance 622) indicating a search based on a person associated with the first affordance. For example, referring back to FIG. 6D, the electronic device displays contact affordance 622 in response to activation of affordance 610C. Contact affordance 622 includes the name David Jones, indicating that the search is based on the previously selected affordance 610C. The electronic device receives an input corresponding to an activation of the second affordance (e.g., activation of contact affordance 622). In response to receiving the input corresponding to the activation of the second affordance, the electronic device displays (e.g., concurrently with search results) a first search narrowing affordance (e.g., "from" affordance 642A) and a second search narrowing affordance (e.g., "to" affordance 642B).

For example, as shown in FIG. 6E, the electronic device displays "from" affordance 642A (e.g., a first search narrowing affordance) and "to" affordance 642B (e.g., a second search narrowing affordance) in response to receiving activation of contact affordance 622. In accordance with some embodiments, the electronic device displays "message" affordance 642C.

In some examples, after initiation of a person-type search, the displayed search results include messages that include the searched-for person in at least one of a number of message fields. For example, such message fields include: to, from, cc, bcc, message subject/title, and message body. In accordance with some embodiments, contact affordance 622 includes search-type indicator 622A, which provides an indication of which message field (or fields) of the results was searched for mention of the searched-for person. Search-type indicator 622A of user interface 640 indicates that a message-type search was performed for the person David Jones, as the indicator 622A reads "Message:". A message-type search includes results that mention searched-for person David Jones in one or more of the message fields: "to", "from", "subject/title", and "body". Other search types include a from-type message search, which searches the "from" message field, and to-type search, which searches the "to", "cc", and/or bcc" message fields. In accordance with some embodiments, in response to receiving a particular user input (e.g., a tap on contact affordance 622), the device displays a search-type selector 642, as shown in FIG. 6E. Search-type selector 642 contains affordances for selecting a search type, including "from" affordance 642A for a from-type search, "to" affordance 642B for a to-type search, and "message" affordance 642C for a message-type search. The affordance corresponding to the search type of the currently-displayed results is optionally shaded, colored, hatched, or otherwise indicate the current search type. For example, search-type affordance 642C of user interface 640 is hatched, which indicates that the displayed results correspond to (e.g., are a result of) a message-type search. Because the results displayed at user interface 640 correspond to a message-type search, the results include messages that are both "to" and "from" David Jones. For example, the search result represented by message affordance 644 corresponds to an email message to David Jones, and the search result represented by message affordance 646 corresponds to an email message from David Jones. Each search result optionally includes an indicator, such as 644A or 646A, to convey to the user which search-type is associated with the result for the searched-for person. Thus, an interface for receiving changes to the scope of the message search is provided that allows for a simple and intuitive user input.

If the first search narrowing affordance (e.g., "from" affordance 642A) is activated, the search results are narrowed to emails from the person. If the second search narrowing affordance (e.g., "to" affordance 642B) is activated, the search results are narrowed to emails to the person. In some embodiments, the first search narrowing affordance and the second search narrowing affordance are automatically displayed on the display in response to receiving the input corresponding to an activation of a first affordance (e.g., 610C) of the one or more affordances (e.g., without the need for additional user input). In some embodiments, in response to detecting activation of the first search narrowing affordance (e.g., "to" affordance 642B), the second affordance (e.g., contact affordance 622) is updated to indicate that the search is being narrowed (e.g., contact affordance 622 is updated to include "To:", indicating that the search is limited to the "to field" of emails, as illustrated by search-type indicator 622A of user interface 650 in FIG. 6F.)

FIG. 6F illustrates an exemplary user interface 650 for changing a search-type. In accordance with some embodiments, the electronic device receives an input corresponding to an activation of the first search narrowing affordance (e.g., "from" affordance 642A). In response to receiving the input corresponding to the activation of the first search narrowing affordance, the electronic device updates displayed search results to only include search results associated with emails that include the person as a sender. In accordance with some embodiments, activation of the second search narrowing affordance (e.g., "to" affordance 642B) causes the device to update the displayed search results to only include search results associated with emails that include the person as a recipient (e.g., in the "to" field or the "cc" field of the emails). For example, referring back to FIG. 6E, user input is received corresponding to "to" affordance 642B of user interface 640. In response, only search results that include David Jones as a recipient are displayed and "to" affordance 642B appears selected (e.g., highlighted), as shown in user interface 650 of FIG. 6F. In response to detecting activation (e.g., selection) of a displayed search result, the electronic device displays an email associated with that search result. Upon receiving user selection of "to" affordance 642B, which corresponds to a to-type search, only messages which include David Jones in the "to", "cc", or "bcc" fields are displayed. In response to the user input, the electronic device optionally initiate a search (e.g., a new search), or the electronic device optionally narrows the search results of a previous search (e.g., no new search is initiated). Search-type indicator 622A of user interface 650 has been updated to reflect the newly-selected search-type, and now reads "To:", indicating a to-type search for person David Jones. Accordingly, the displayed search results of user interface 650 correspond to messages which include David Jones in the "to" field. Thus, the scope of the message search is quickly and easily modified.

Notably, search result 646 (displayed at user interface 640 of FIG. 6E), which corresponds to the message from David Jones titled "Project Outline", is not displayed at user interface 650 of FIG. 6F because it no longer meets a criterion of the to-type search (e.g., it is not to David Jones). In its place, search result 652 is displayed at the display of user interface 650, which corresponds to the message to David Jones titled "Welcome to . . . ". The message titled "Welcome to . . . " is the next email (of corresponding categorized message list 622 of FIG. 6C and associated example user interface 624 of FIG. 6D) which satisfies criteria of the search (e.g., messages that are "to" David Jones). Notably, the message associated with search result 652 satisfied the search criteria both before and after the change in search-type, however was not visibly displayed (without scrolling downward) on user interface 640 due to the limited display area of the exemplary device shown in FIG. 6E. Search-type selector 642 optionally ceases to be displayed if user input is received which corresponds to a selection of (e.g., a tap on) contact affordance 622 or to scrolling of the search results (e.g., downward scroll).

FIG. 6G illustrates an exemplary user interface 660 for changing a searched message database. In accordance with some embodiments, the electronic device displays a first account selection affordance (e.g., "all accounts" selection affordance 652A). For example, the first account selection affordance is displayed concurrently with a second account selection affordance (e.g., for a particular account, such as "apple.com" selection affordance 652B). The first account selection affordance and the second account selection affordance are optionally displayed in response to detecting a user input, such as a scrolling input or pull-down gesture on a display (or touch sensitive-surface) of the electronic device.

In some examples, account selection affordances 652A-652C of database selector 652 are displayed if user input is received which corresponds to scrolling of the search results (e.g., upward scrolling toward the top of the search results). Message database selector 652 allows user input specifying one or more databases for searching. Message database selector 652 optionally includes affordances for selecting one or more databases. Affordance 652A corresponds to a database of messages associated with all (or some) of a user's accounts (e.g., all of a user's email accounts accessible to the device). Affordance 652B corresponds to a database of messages associated with one or more particular accounts (e.g., one or more email accounts ending with domain name "apple.com"). Affordance 652C corresponds to a database of unread messages (e.g., unread messages of any of user's accounts accessible to the device). The term "message database" or "database", as used herein, may refer to, for example, all of the messages of an account, a subset of messages of an account, or a combination of messages of a plurality of accounts. The messages of a database are optionally stored locally, remotely, or both. Additionally, one or more of affordances 652A-652C are optionally shaded, colored, or hatched to indicate the current message database corresponding to the current search results. For example, affordance 652B of user interface 660 is hatched, indicating that only messages from accounts ending with the domain name "apple.com" are being displaying.

FIG. 6H illustrates an exemplary user interface 670 for viewing the results of a change to the selected message database. The electronic device receives an input corresponding to activation of the first account selection affordance. In response to receiving the input corresponding to activation of the first account selection affordance (e.g., "all accounts" selection affordance 652A), the electronic device expands the search results to include search results based on a plurality of email accounts (e.g., all email accounts configured for a particular email software client). For example, referring back to FIG. 6G, account selection affordances 652A-652C are displayed at user interface 660. Returning to FIG. 6H, user interface 670 illustrates that "all accounts" selection affordance 652A, corresponding to all accounts, has been activated. In response, the electronic device has expanded the search results—the email "Research Results" of Feb. 10, 2025 is now included, for example. In response to detecting activation of affordance 652A, the device broadens the search criteria to include a database of messages corresponding to all email accounts accessible to a particular (e.g., the displayed) email software client on the electronic device. Because the database of messages subject to search has been expanded, a new search result message affordance 672 (e.g., not previously a search result) is displayed at user interface 670. Message affordance 672 corresponds to the email to David Jones titled "Research Results" dated Feb. 10, 2025. Notably, the search result categories have changed as a result of new search result 672—because the search results now include two messages dated Feb. 10, 2025 (i.e., today's date), the number of messages for the time period of today is higher than the threshold (i.e., one) for being displayed as a search result category. Accordingly, the search results represented by message affordances 644 and 672 are included in the time period of today and are displayed under search result heading 670A, which reads "Today" Likewise, the search results corresponding to the time period of yesterday, amounting to greater than the threshold, are included under the search result heading 670B, which reads "Yesterday"—the term "Since" has been dropped from the heading because the represented time period no longer corresponds to different or coalesced time periods. Thus, the selection of email accounts that are subject to the search is quickly and easily modified.

Figure 6I:
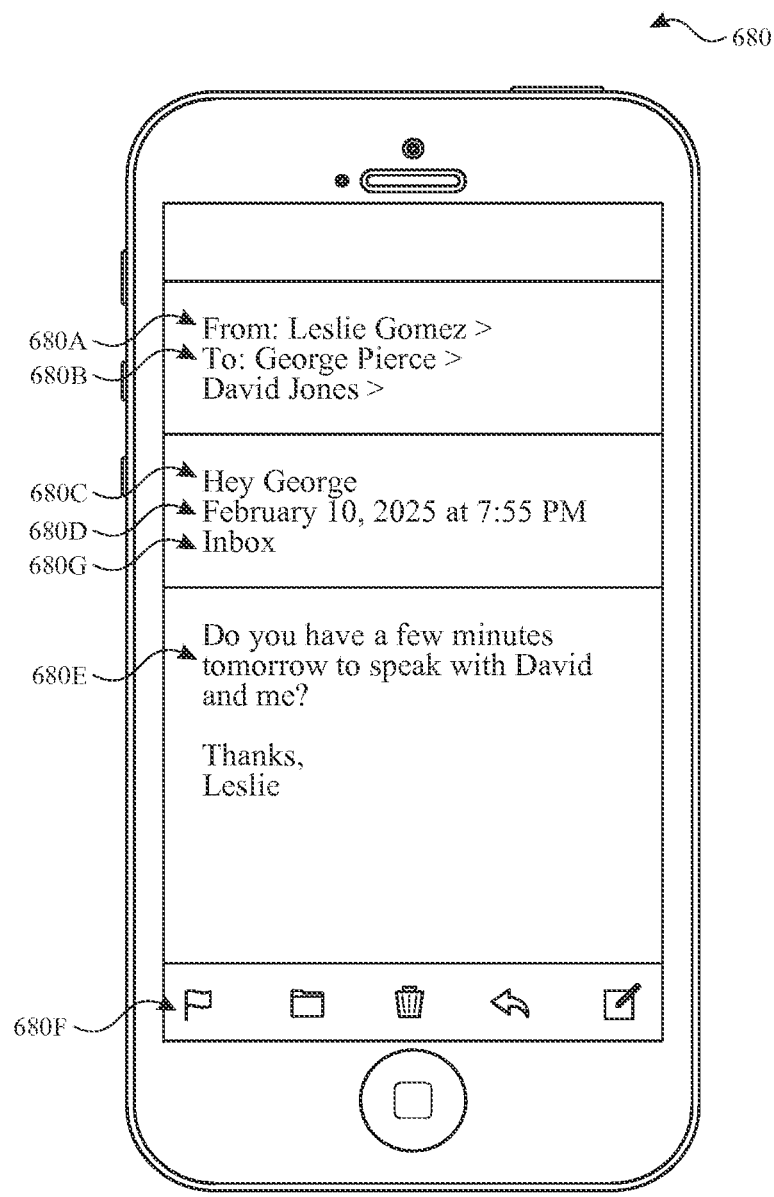

FIG. 6I illustrates an exemplary user interface 680 for viewing a message. In accordance with some embodiments, each displayed search result of the at least some of (or all of) the search results is an affordance. The electronic device receives an input corresponding to an activation of a displayed search result (e.g., message affordance 644 of FIG. 6H) of the at least some of the search results. In response to receiving the input corresponding to the activation of the displayed search result (e.g., message affordance 644 of FIG. 6H) of the at least some of the search results, the electronic device displays an email corresponding to the displayed search result (e.g., replacing the displayed respective search result group with message viewing user interface 680 of FIG. 6I). For example, the electronic device receives input at interface 670 of FIG. 6H corresponding to an activation of the search result represented by message affordance 644 (the email with subject "Hey George"). In response to the input, the electronic device displays user interface 680 of FIG. 6I, which illustrates a viewed message, and in particular, the email corresponding to the search result represented by message affordance 644.

Viewed message user interface 680 of FIG. 6I includes a "from" field 680A, which indicates one or more persons, contacts, addresses, or numbers from which the message was received. The message of user interface 680 was sent by the person "Leslie Gomez", for example. A "to" field 680B is also included, which indicates one or more persons, contact, addresses, or numbers to which the message was sent. The message of user interface 680 was sent to persons "George Pierce" and "David Jones". In addition, user interface 680 includes subject field 680C (the subject/title of the message is "Hey George") and message date field 680D (the message was sent Feb. 10, 2025 at 7:55 PM). Indicator 680G provides information as to the location of the message (e.g., an Inbox folder, in the example shown). Message body 680E includes the body of the message. Ribbon 680F of user interface 680 includes one or more affordances, for example, for quickly and conveniently receiving user interactions with the displayed message (e.g., affordances for flagging the message, sending the message to a folder, deleting the message, replying or forwarding the message, and composing a new message).

In accordance with some embodiments, the different time period is a coalesced time period. For example, the different time period includes search results from multiple time periods. A coalesced time period includes a plurality of time periods, such time periods having been grouped together according to the algorithm described herein. Referring back to FIG. 6G, for example, category heading 644A represents a coalesced time period because it includes the time periods of today, yesterday, and since last week, grouped into "Since Last Week". Thus, search result information is presented in an easily readable and efficient manner.

In accordance with some embodiments, the different time period is an earlier time period. For example, referring back to user interface 630 of FIG. 6D, the search result from the respective time period today (e.g., the message titled "Hey George") is included in the group of search results of the different time period yesterday, an earlier time period. The category heading 630A reads "Since Yesterday" to reflect the inclusion. Thus, search result information is presented in an easily readable and efficient manner.

In accordance with some embodiments, the different time period is adjacent to the respective time period. In accordance with some embodiments, the plurality of time periods include: current day (e.g., today); previous day (e.g., yesterday); and since last week (e.g., the current and previous calendar weeks), not including the current day and the previous day.

In accordance with some embodiments, the plurality of time periods includes: current day (e.g., today); previous day (e.g., yesterday); since last week (e.g., the current and previous calendar weeks), not including the current day and the previous day; and current month (e.g., January), not including the current day, the previous day, and since last week.

In accordance with some embodiments, prior to initiating the search, the electronic device determines that the search term matches a subject or body of one or more emails (e.g., an email subject includes the search term or a variation of the search term). In response to determining that the search term matches one or more of the subject or body of one or more emails, the electronic device displays (e.g., concurrently with the one or more affordances corresponding to the one or more persons) one or more affordances corresponding to the one or more emails. For example, referring back to FIG. 6B, the two message affordances displayed under heading 610D correspond to messages that were determined to match the search term "David" in one or both of their message subject or body. In response to detecting activation of an affordance of the one or more affordances corresponding to the one or more emails, the device displays an email associated with that affordance. For example, activation of affordance 610E, corresponding to the email with subject "Welcome David!", of user interface 610 in FIG. 6B, would cause the device to display the associated email. Thus, an email is quickly and easily retrievable prior to initiating the search.

In accordance with some embodiments, prior to initiating the search, the electronic device determines that the search term matches one or more attachments of one or more emails (e.g., the filename of an attachment or the content of an attachment includes the search term or a variation of the search term). In response to determining that the search term matches one or more attachments of the one or more emails, the electronic device displays (e.g., concurrently with the one or more affordances corresponding to the one or more persons) one or more affordances corresponding to the one or more attachments. For example, referring back to FIG. 6B, the attachment affordance 610G displayed under heading 610F corresponds to an attachment that was determined to match the search term "David" in the contents of the text attachment. In response to detecting activation of an affordance of the one or more affordances corresponding to the one or more attachments is activated, the device displays an email associated with that attachment or, alternatively, the device displays a portion of the contents of that attachment. For example, activation of affordance 610G, corresponding to the attachment named "DaveSummary.txt" of user interface 610 in FIG. 6B causes the device to display either the associated email, or at least a portion of the contents of the text file attachment. Thus, an email or attachment is quickly and easily retrievable prior to initiating the search.

FIGS. 7A-7F illustrate exemplary lists of emails and associated user interfaces for displaying categorized lists of emails, in accordance with some embodiments. FIGS. 7A-7F illustrate an exemplary algorithm for organizing and displaying electronic message search results.

FIG. 7A illustrates a list of emails categorized in accordance with some embodiments. Message list 702 illustrates a list of uncategorized emails. Message list 702 represents a listing of electronic messages, which is optionally stored locally (e.g., stored on the electronic device), remotely (e.g., stored on at least one remote device or server), or a combination of both. Each message of message list 702 has an associated message date, which represents when the message was sent or received. Each message of message list 702 also has an associated message subject, which correspond to the subject line of an email, for example.

Categorized message list 704 illustrates the result of categorization of electronic messages according to the algorithm described above, in accordance with some embodiments, to produce a more user-friendly organization of message list 702. Message list 702 represents a list of search results, and for each respective time period of at least two time periods of the plurality of time periods: the device determines whether there are more than a predetermined number of search results for the respective time period. For example, a first respective time period corresponds to the time period today; a second respective time period corresponds to the time period yesterday; a third respective time period corresponds to the time period since last week (Feb. 1, 2025 through Feb. 8, 2025); and a fourth respective time period corresponds to the time period for the calendar month January 2025. The predetermined number of search results is one. The device determines that the first respective time period "today" contains search results. As a result, the device displays the search results for time period "today" as a search result group (e.g., message group 704A) with heading "Today". The device determines that the second respective time period "yesterday" contains three search results. As a result of containing more than the predetermined number of search results, the device displays the search results for the time period "yesterday" as a search result group (e.g., message group 704B). The third respective time period "since last week" contains six search results. As a result of containing more than the predetermined number of search results, the device displays the search results for the time period "since last week" as a search result group (e.g., message group 704C). The fourth respective time period "January 2025" contains three search results. As a result of containing more than the predetermined number of search results, the device displays the search results for the time period "January 2025" as a search result group (e.g., message group 704D). Because each of the respective time periods contains more than one search result, the search results of any of the respective time period are not included in search results of a different time period.

Figure 7B:
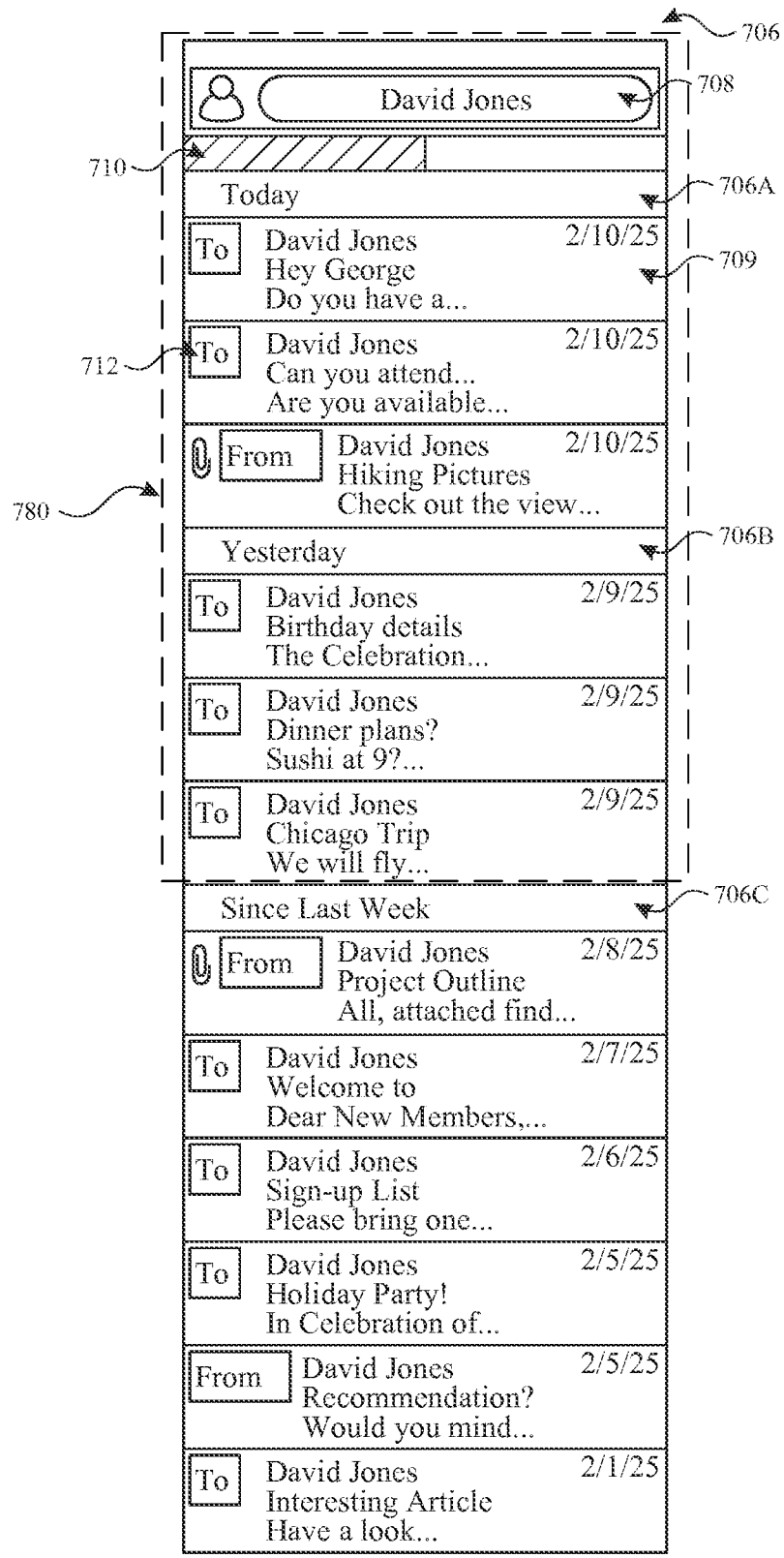

FIG. 7B illustrates an exemplary user interface 706, which depicts categorized message list 704 of FIG. 7A as a user interface. User interface 706 includes contact affordance 708, which indicates that user interface 706 includes the results of a search conducted using a person as a criterion (e.g., a person-type search using the contact named David Jones). Category headings 706A-706C correspond to message groups 704A-704C of FIG. 7A, respectively. Category headings provide an indication of the time period(s) to which corresponding messages belong. Message affordance 709 represents an electronic message of message list 702. Specifically, message affordance 709 corresponds to the electronic message sent to the contact named "David Jones", with the subject "Hey George", and message body beginning with "Do you have a . . . ". A message affordance includes indicator 712 which indicates whether a message is "to" or "from" the person indicated by contact affordance 708. User interface 706 also includes a progress indicator 710, which indicates whether a search is still being conducted and may also indicate the progress of such search. The portion defined by area 780 is actively displayed on the electronic device. The portions of the user interface outside of area 780 are accessible, for example, by scrolling the interface.

FIG. 7C illustrates uncategorized message list 720 and corresponding categorized message list 722. Categorized message list 722 illustrates the result of categorization of electronic messages according to the algorithm described above, in accordance with some embodiments, to produce a more user-friendly organization of message list 720. Message list 720 represents a list of search results, and for each respective time period of at least two time periods of the plurality of time periods: the device determines whether there are more than a predetermined number of search results for the respective time period. For example, a first respective time period corresponds to the time period "today"; a second respective time period corresponds to the time period "yesterday"; and a third respective time period corresponds to the time period "since last week" (Feb. 1, 2025 through Feb. 8, 2025). The predetermined number of search results is one. The device determines that the first respective time period "today" contains only one message ("Hey George" of Feb. 10, 2025). As a result of not containing more than the predetermined number of search results, the device includes search results of the first respective time period "today" in the search results of a different time period (the second respective time period "yesterday"). The device does not display the search results of the first respective time period in its own group. The device determines that the second respective time period yesterday contains four messages (e.g., three results from February 9 and the included results from February 10). As a result of containing more than the predetermined number of search results, the device displays a search result group (e.g., message group 722A), which also includes the one message from today ("Hey George"). The device determines that the third respective time period since last week contains six messages. As a result of containing more than the predetermined number of search results, the device displays a search result group (e.g., message group 722B).

Figure 7D:
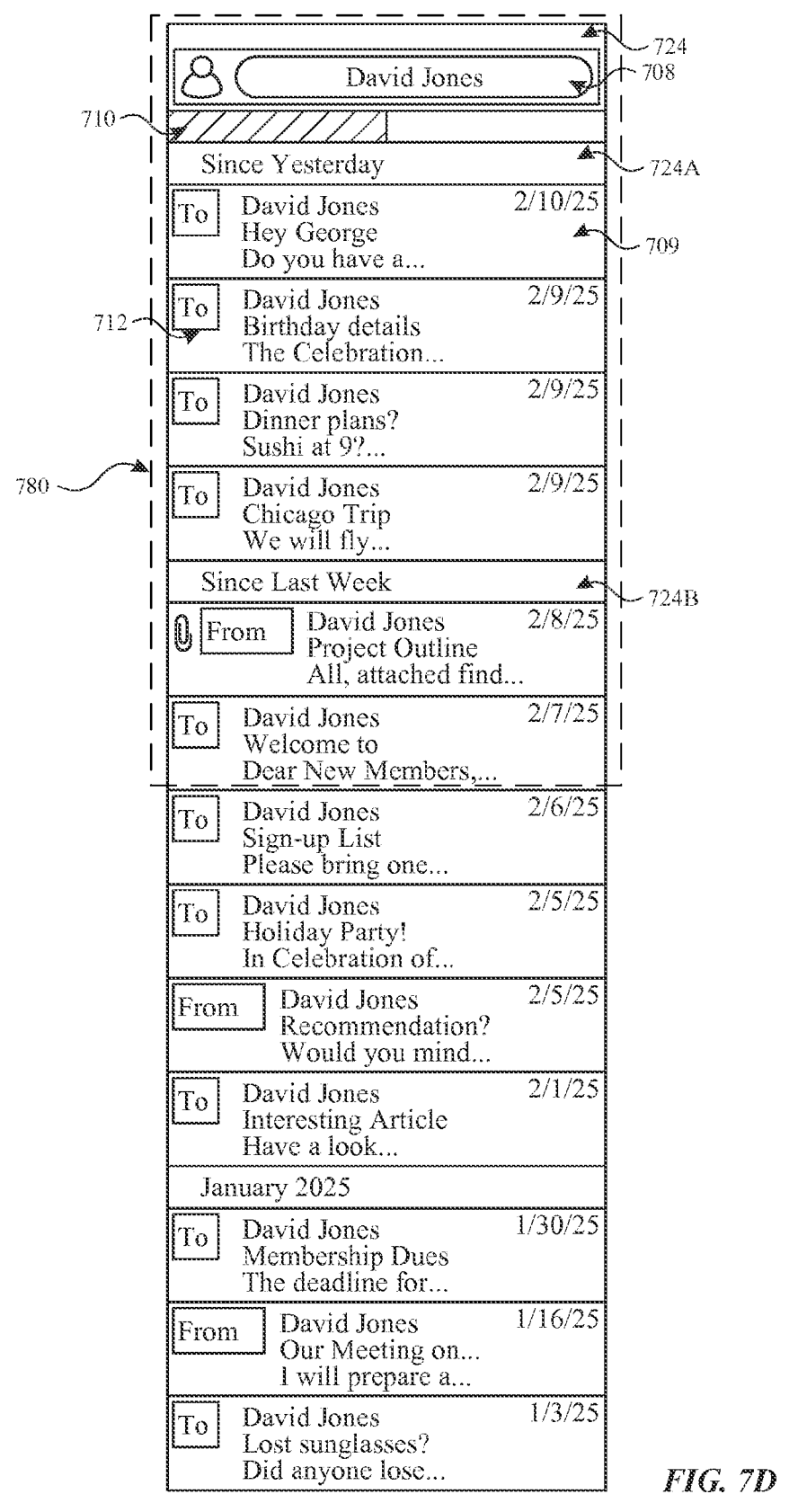

FIG. 7D illustrates an exemplary user interface 724, which depicts categorized message list 722 of FIG. 7C as a user interface. User interface 724 includes contact affordance 708, which indicates that user interface 724 includes the results of a search conducted using a person as a criterion (e.g., the contact named David Jones). Category headings 724A-724B correspond to message groups 722A-722B of FIG. 7C, respectively. Category headings provide an indication of the time period(s) to which corresponding messages belong. Message affordance 709 represents an electronic message of message list 702. Specifically, message affordance 709 corresponds to the electronic message sent to the contact named "David Jones", with the subject "Hey George", and message body beginning with "Do you have a . . . ". A message affordance includes indicator 712 which indicates whether a message is "to" or "from" the person indicated by contact affordance 708. User interface 724 also includes a progress indicator 710, which indicates whether a search is still being conducted and may also indicate the progress of such search. The portion defined by area 780 is actively displayed on the electronic device. The portions of the user interface outside of area 780 are accessible, for example, by scrolling the interface.

FIG. 7E illustrates uncategorized message list 730 and corresponding categorized message list 732, categorized according the above-described algorithm. Categorized message list 732 illustrates the result of categorization of electronic messages according to the algorithm described above, in accordance with some embodiments, to produce a more user-friendly organization of message list 730. Message list 730 represents a list of search results, and for each respective time period of at least two time periods of the plurality of time periods: a device determines whether there are more than a predetermined number of search results for the respective time period. For example, a first respective time period corresponds to the time period today; a second respective time period corresponds to the time period yesterday; and a third respective time period corresponds to the time period since last week. The predetermined number of search results is one. The device determines that the first respective time period "today" contains three messages. As a result of containing more than the predetermined number of search results, the device displays a search result group (e.g., message group 732A). The device determines that the second respective time period yesterday contains only one message ("Birthday details" of Feb. 9, 2025). As a results of not containing more than the predetermined number of search results, the device does not display a search result group and the search results are included with the search results of a different time period (the third respective time period since last week). The third respective time period contains seven results (e.g., six results from the time period since last week and one result included from the second respective time period. As a result, the device displays a search result group (e.g., message group 732B), which includes the one message from yesterday ("Birthday details").

Figure 7F:
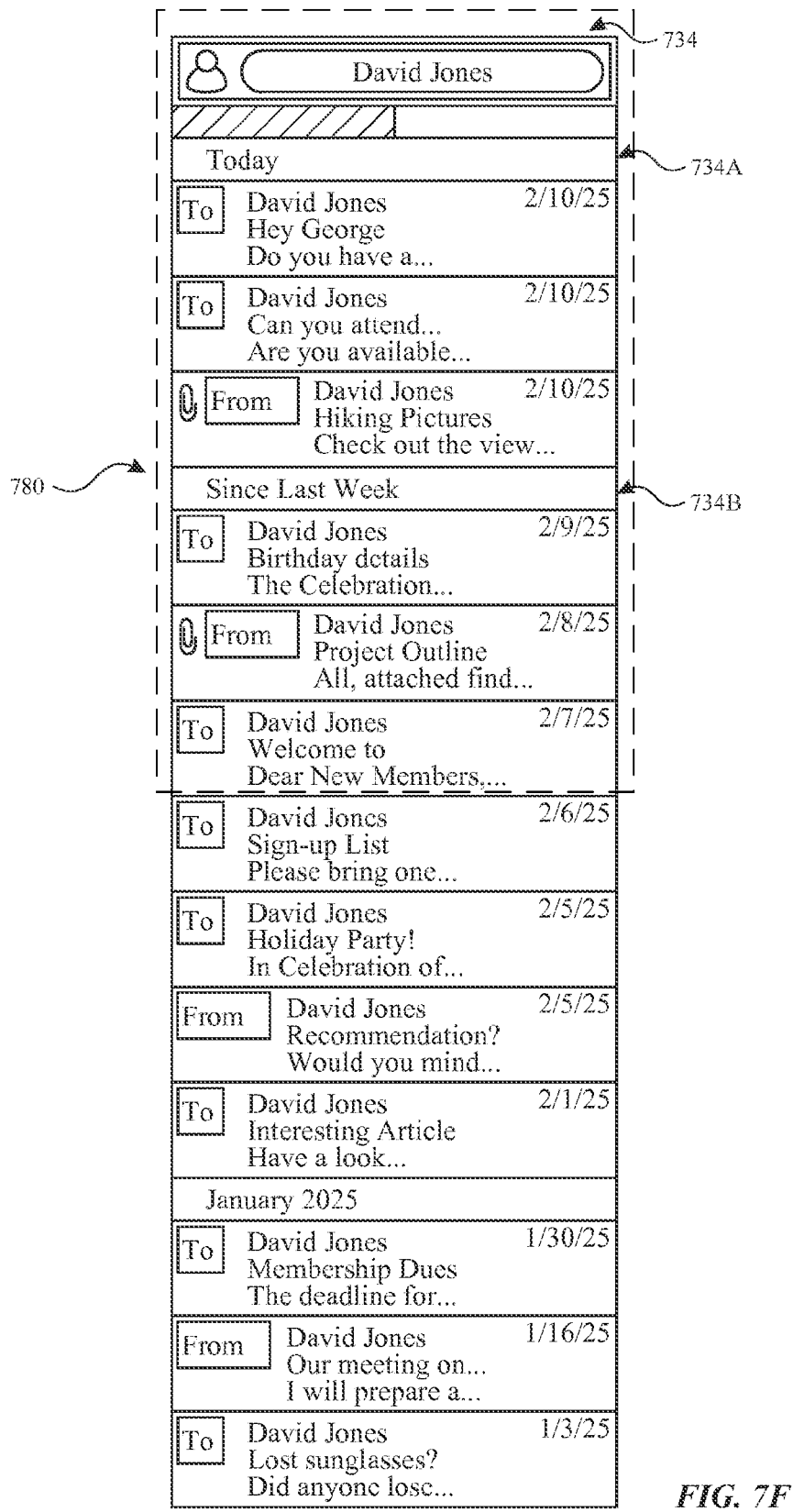

FIG. 7F illustrates an exemplary user interface 734, which depicts categorized message list 732 of FIG. 7E as a user interface. Category headings 734A-734B correspond to message groups 732A-732B of FIG. 7E, respectively. The portion defined by area 780 is actively displayed on the electronic device. The portions of the user interface outside of area 780 are accessible, for example, by scrolling the interface.

Figure 8A:
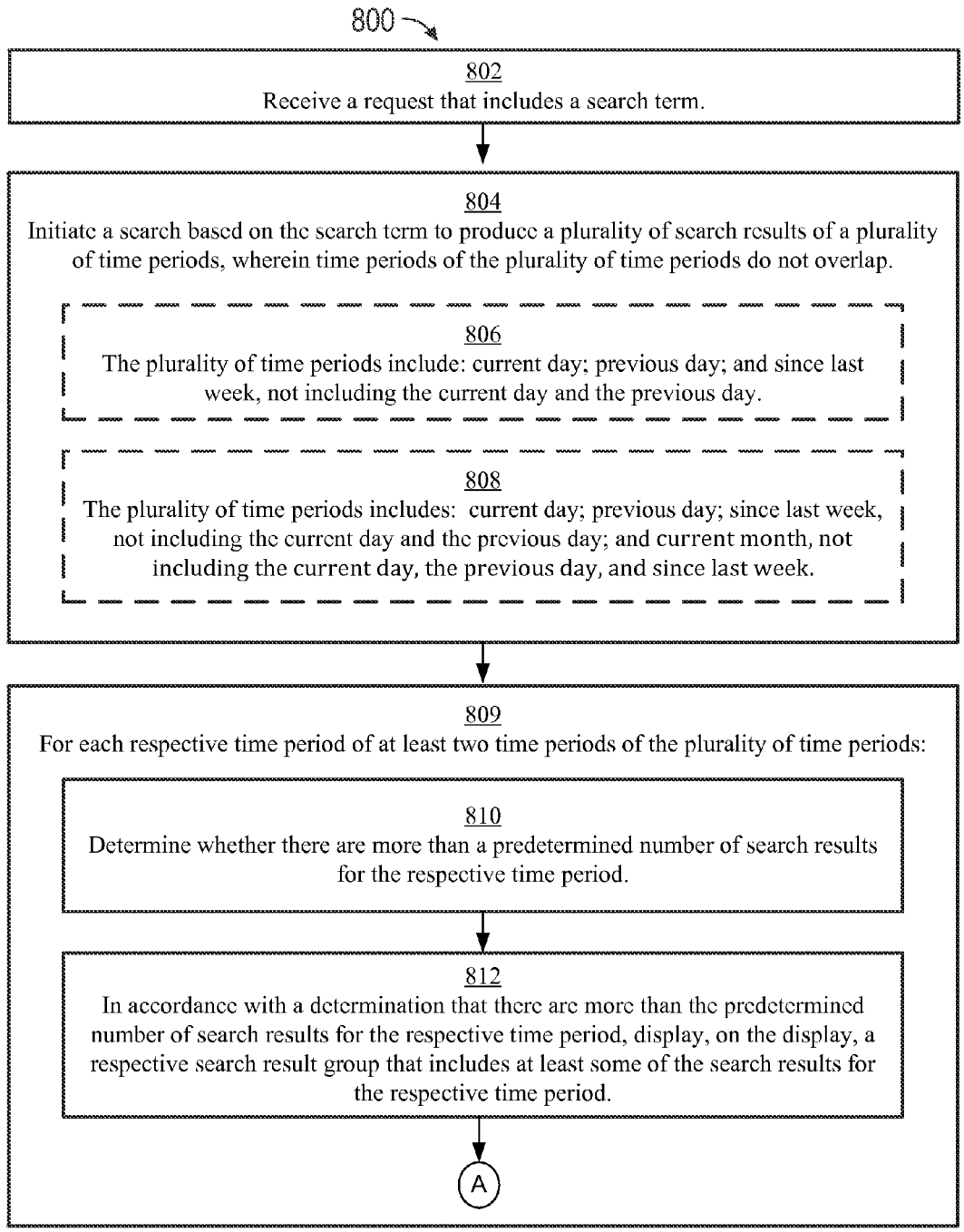
Figure 8B:
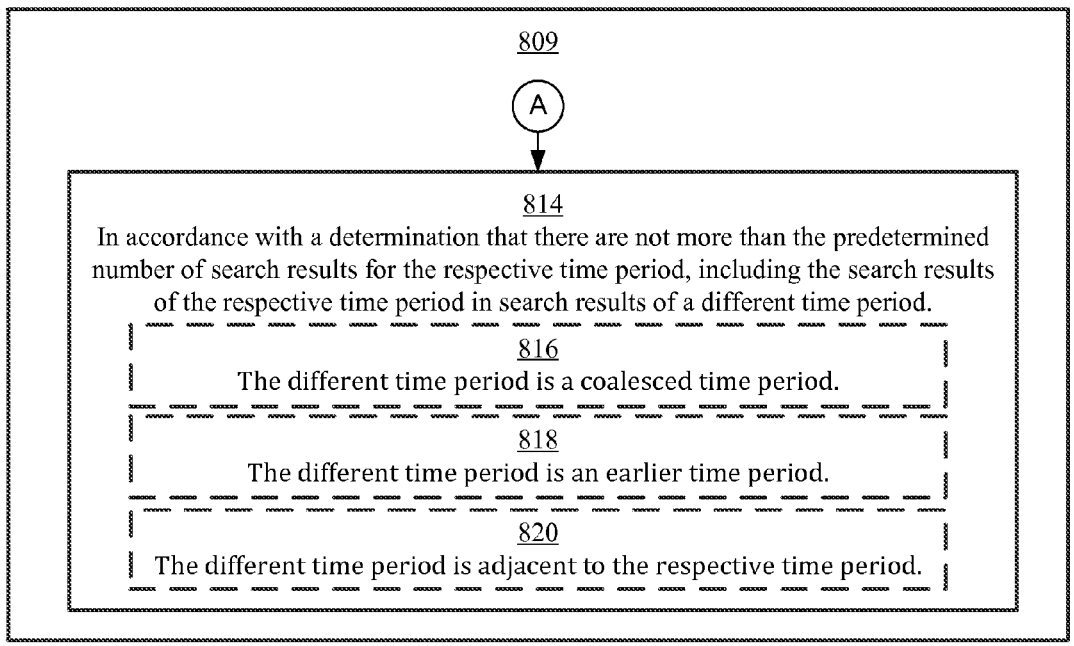
Figure 8B:
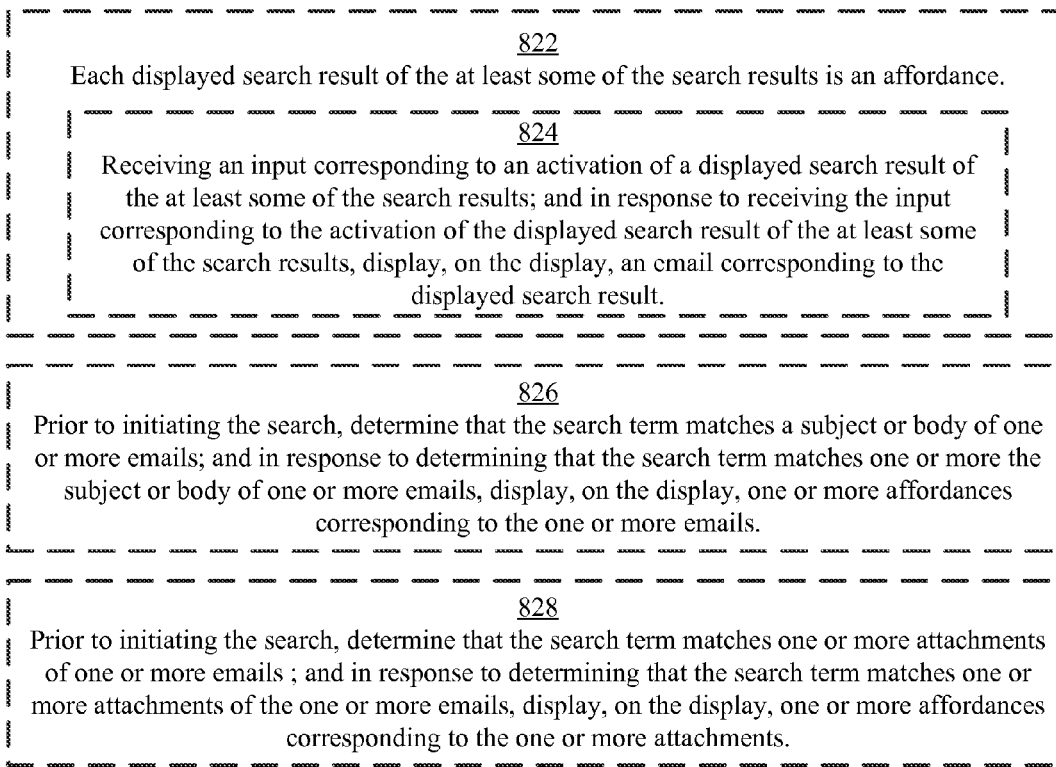

FIGS. 8A-8C are flow diagrams illustrating a method for electronic message searching using an electronic device in accordance with some embodiments. Method 800 is performed at a device (e.g., 100, 300, 500) with a display. Some operations in method 800 can be combined, the order of some operations can be changed, and some operations can be omitted.

As described below, method 800 provides an intuitive way for searching electronic messages. The method reduces the cognitive burden on a user when reviewing electronic message search results, thereby creating a more efficient human-machine interface. For battery-operated computing devices, enabling a user to search electronic messages faster and more efficiently conserves power and increases the time between battery charges.

At block 802, the device receives a request that includes a search term (e.g., "David" of field 604). FIG. 6A, for example, shows the search term "David".

At block 804, the device initiates a search based on the search term to produce a plurality of search results of a plurality of time periods, wherein time periods of the plurality of time periods do not overlap.

At block, 806, in some embodiments, the plurality of time periods include: current day; previous day; and since last week, not including the current day and the previous day.

At block 808, in some embodiments, the plurality of time periods includes: current day; previous day; since last week, not including the current day and the previous day; and current month, not including the current day, the previous day, and since last week.

At block 809, for each respective time period of at least two time periods of the plurality of time periods, the technique continues to block 810.

At block 810, the device determines whether there are more than a predetermined number of search results for the respective time period.

At block 812, in accordance with a determination that there are more than the predetermined number of search results for the respective time period, the device displays, on the display, a respective search result group (e.g., the search result group of 630A in FIG. 6D) that includes at least some of the search results for the respective time period.

At block 814, in accordance with a determination that there are not more than the predetermined number of search results for the respective time period, the device includes the search results of the respective time period in search results of a different time period. FIG. 6D, for example, shows the search result of the respective time period of today included with the search results of the different time period of yesterday, under category heading 630A which reads "Since Yesterday". The single search result from the time period today does not exceed the predetermined number of search results (e.g., one), and thus is included with the results of yesterday. Because the combined results of today and yesterday exceed the predetermined number threshold, they are displayed under a category heading.

At block 816, in some embodiments, the different time period is a coalesced time period. At block 818, in some embodiments, the different time period is an earlier time period. At block 820, in some embodiments, the different time period is adjacent to the respective time period.

At block 822, in some embodiments, each displayed search result of the at least some of the search results is an affordance (e.g., message affordance 644 of FIG. 6E).

At block 824, in some embodiments, the device receives an input corresponding to an activation of a displayed search result (e.g., message affordance 644 of FIG. 6H) of the at least some of the search results; and in response to receiving the input corresponding to the activation of the displayed search result of the at least some of the search results, the device displays, on the display, an email (e.g., user interface 680 of FIG. 6I) corresponding to the displayed search result.

At block 826, in some embodiments, prior to initiating the search, the device determines that the search term matches a subject or body of one or more emails; and in response to determining that the search term matches one or more the subject or body of one or more emails, the device displays, on the display, one or more affordances (e.g., affordance 610E of FIG. 6B) corresponding to the one or more emails.

At block 828, in some embodiments, prior to initiating the search, the device determines that the search term matches one or more attachments of one or more emails; and in response to determining that the search term matches one or more attachments of the one or more emails, the device displays, on the display, one or more affordances (e.g., affordance 610G of FIG. 6B) corresponding to the one or more attachments.

At block 830, in some embodiments, the device displays, on the display, a first account selection affordance (e.g., "all accounts" selection affordance 652A of FIG. 6G); the device receives an input corresponding to activation of the first account selection affordance; and in response to receiving the input corresponding to activation of the first account selection affordance, the device expands the search results (e.g., displays the new search result associated with message affordance 672 of FIG. 6H) to include search results based on a plurality of email accounts.

At block 832, in some embodiments, prior to initiating the search, the device determines that the search term matches one or more persons. In response to determining that the search term matches one or more persons, the device displays, on the display, one or more affordances (e.g., affordance 610C of FIG. 6B) corresponding to the one or more persons. The device receives an input corresponding to an activation of a first affordance (e.g., affordance 610C of FIG. 6B) of the one or more affordances; and in response to receiving the input corresponding to the activation of the first affordance of the one or more affordances, the device initiates the search.

At block 834, in some embodiments, in response to receiving the input corresponding to the activation of the first affordance of the one or more affordances, the device displays, on the display, a second affordance (e.g., contact affordance 622 of FIG. 6E) indicating a search based on a person associated with the first affordance (e.g., affordance 610C of FIG. 6B). The device receives an input corresponding to an activation of the second affordance (e.g., contact affordance 622 of FIG. 6E). In response to receiving the input corresponding to the activation of the second affordance, the device displays, on the display, a first search narrowing affordance (e.g., affordance 642A of FIG. 6E) and a second search narrowing affordance (e.g., affordance 642B of FIG. 6E).

At block 836, in some embodiments, the device receives an input corresponding to an activation of the first search narrowing affordance (e.g., affordance 642A of FIG. 6E); and in response to receiving the input corresponding to the activation of the first search narrowing affordance, the device updates displayed search results to only include search results associated with emails that include the person as a sender. In another example, FIG. 6F shows the result of the device receiving input corresponding to the activation of the second search narrowing affordance (e.g., 642B). As shown, search results have been narrowed to display emails that include David Jones as a recipient. Similarly, activation of the first search narrowing affordance (e.g., 642A) would result in the displayed search results only including search results associated with David Jones as a sender.

Figure 9:
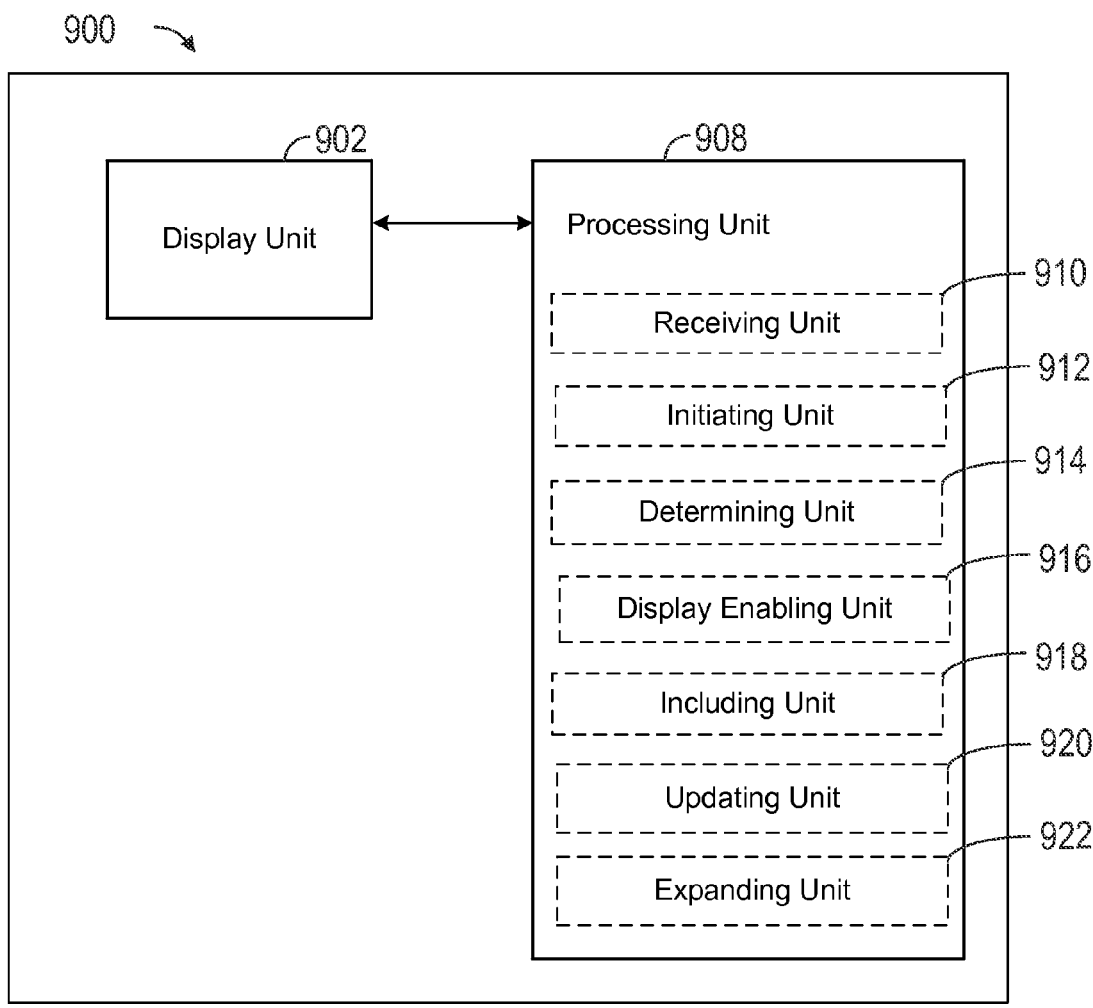
FIG. 9 is a functional block diagram of an electronic device in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above.

The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902 configured to display a graphic user interface and a processing unit 908 coupled to the display unit 902. In some embodiments, the processing unit 908 includes a receiving unit 910, an initiating unit 912, a determining unit 914, a display enabling unit 916, an including unit 918, an updating unit 920, and an expanding unit 922.

The processing unit 908 is configured to: receive (e.g., with receiving unit 910) a request that includes a search term; initiate (e.g., with initiating unit 912) a search based on the search term to produce a plurality of search results of a plurality of time periods, wherein time periods of the plurality of time periods do not overlap; and for each respective time period of at least two time periods of the plurality of time periods: determine (e.g., with determining unit 914) whether there are more than a predetermined number of search results for the respective time period; in accordance with a determination that there are more than the predetermined number of search results for the respective time period, enable display (e.g., with display enabling unit 916), on the display unit 902, of a respective search result group that includes at least some of the search results for the respective time period; and in accordance with a determination that there are not more than the predetermined number of search results for the respective time period, include (e.g., with including unit 918) the search results of the respective time period in search results of a different time period.

In some embodiments, the different time period is a coalesced time period.

In some embodiments, the different time period is an earlier time period.

In some embodiments, the different time period is adjacent to the respective time period.

In some embodiments, the plurality of time periods include: current day; previous day; and since last week, not including the current day and the previous day.

In some embodiments, the plurality of time periods includes: current day; previous day; since last week, not including the current day and the previous day; and current month, not including the current day, the previous day, and since last week.

In some embodiments, each displayed search result of the at least some of the search results is an affordance, and the processing unit 908 is further configured to: receive (e.g., with receiving unit 910) an input corresponding to an activation of a displayed search result of the at least some of the search results; and in response to receiving the input corresponding to the activation of the displayed search result of the at least some of the search results, enable display (e.g., with display enabling unit 916), on the display unit 902, of an email corresponding to the displayed search result.

In some embodiments, the processing unit 908 is further configured to: prior to initiating the search, determine (e.g., with determining unit 914) that the search term matches one or more persons; in response to determining that the search term matches one or more persons, enable display (e.g., with display enabling unit 916), on the display unit 902, of one or more affordances corresponding to the one or more persons; receive (e.g., with receiving unit 910) an input corresponding to an activation of a first affordance of the one or more affordances; and in response to receiving the input corresponding to the activation of the first affordance of the one or more affordances, initiate (e.g., with initiating unit 912) the search.

In some embodiments, the processing unit 908 is further configured to: in response to receiving the input corresponding to the activation of the first affordance of the one or more affordances, enable display (e.g., with display enabling unit 916), on the display unit 902, of a second affordance indicating a search based on a person associated with the first affordance; receive (e.g., with receiving unit 910) an input corresponding to an activation of the second affordance; and in response to receiving the input corresponding to the activation of the second affordance, enable display (e.g., with display enabling unit 916), on the display unit 902, of a first search narrowing affordance and a second search narrowing affordance.

In some embodiments, the processing unit 908 is further configured to: receive (e.g., with receiving unit 910) an input corresponding to an activation of the first search narrowing affordance; and in response to receiving the input corresponding to the activation of the first search narrowing affordance, update (e.g., with updating unit 920) displayed search results to only include search results associated with emails that include the person as a sender.

In some embodiments, the processing unit 908 is further configured to: prior to initiating the search, determine (e.g., with determining unit 914) that the search term matches a subject or body of one or more emails; and in response to determining that the search term matches one or more the subject or body of one or more emails, enable display (e.g., with display enabling unit 916), on the display unit 902, of one or more affordances corresponding to the one or more emails.

In some embodiments, the processing unit 908 is further configured to: prior to initiating the search, determine (e.g., with determining unit 914) that the search term matches one or more attachments of one or more emails; and in response to determining that the search term matches one or more attachments of the one or more emails, enable display (e.g., with display enabling unit 916), on the display unit 902, of one or more affordances corresponding to the one or more attachments.

In some embodiments, the processing unit 908 is further configured to: enable display (e.g., with display enabling unit 916), on the display unit 902, of a first account selection affordance; receive (e.g., with receiving unit 910) an input corresponding to activation of the first account selection affordance; and in response to receiving the input corresponding to activation of the first account selection affordance, expand (e.g., with expanding unit 922) the search results to include search results based on a plurality of email accounts.

The operations described above with reference to FIG. 8 are, optionally, implemented by components depicted in FIGS. 1A-1B, 3, 5B, or FIG. 9. For example, receiving operation 802, initiating operation 804, and determining operation 810 can be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3, and 5B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions which, when executed by an electronic device with a display, cause the device to:
   receive a request that includes a search term;
   initiate a search based on the search term to produce a plurality of search results of a plurality of time periods, wherein time periods of the plurality of time periods do not overlap; and
   for each respective time period of at least two time periods of the plurality of time periods:
      determine whether there are more than a predetermined number of search results for the respective time period;
      in accordance with a determination that there are more than the predetermined number of search results for the respective time period, display, on the display, a respective search result group that includes at least some of the search results for the respective time period, wherein displaying the respective search result group includes displaying the at least some of the search results for the respective time period and not displaying a search result for a time period that is outside of the respective time period; and
      in accordance with a determination that there are not more than the predetermined number of search results for the respective time period, display, on the display, a search result group that is different from the respective search result group and that includes the search results of the respective time period, wherein displaying the search result group that is different from the respective search result group includes displaying the search results of the respective time period and the search result for the time period that is outside of the respective time period.

2. The non-transitory computer-readable storage medium of claim 1, wherein the search result group corresponds to a different time period than the respective time period, and wherein the different time period is a coalesced time period.

3. The non-transitory computer-readable storage medium of claim 1, wherein the search result group corresponds to a different time period than the respective time period, and wherein the different time period is an earlier time period.

4. The non-transitory computer-readable storage medium of claim 1, wherein the search result group corresponds to a different time period than the respective time period, and wherein the different time period is adjacent to the respective time period.

5. The non-transitory computer-readable storage medium of claim 1, wherein the plurality of time periods includes:
   current day;
   previous day; and
   since last week, not including the current day and the previous day.

6. The non-transitory computer-readable storage medium of claim 1, wherein the plurality of time periods includes:
   current day;
   previous day;
   since last week, not including the current day and the previous day; and
   current month, not including the current day, the previous day, and since last week.

7. The non-transitory computer-readable storage medium of claim 1, wherein each displayed search result of the at least some of the search results is an affordance, and wherein the non-transitory computer-readable storage medium further comprises instructions, which when executed by the one or more processors of the electronic device, cause the device to:
   receive an input corresponding to an activation of a displayed search result of the at least some of the search results; and
   in response to receiving the input corresponding to the activation of the displayed search result of the at least some of the search results, display, on the display, an email corresponding to the displayed search result.

8. The non-transitory computer-readable storage medium of claim 1, wherein the non-transitory computer-readable storage medium further comprises instructions, which when executed by the one or more processors of the electronic device, cause the device to:
   prior to initiating the search, determine that the search term matches one or more persons;
   in response to determining that the search term matches one or more persons, display, on the display, one or more affordances corresponding to the one or more persons;
   receive an input corresponding to an activation of a first affordance of the one or more affordances; and
   in response to receiving the input corresponding to the activation of the first affordance of the one or more affordances, initiate the search.

9. The non-transitory computer-readable storage medium of claim 8, wherein the non-transitory computer-readable storage medium further comprises instructions, which when executed by the one or more processors of the electronic device, cause the device to:
   in response to receiving the input corresponding to the activation of the first affordance of the one or more affordances, display, on the display, a second affordance indicating a search based on a person associated with the first affordance;

receive an input corresponding to an activation of the second affordance; and in response to receiving the input corresponding to the activation of the second affordance, display, on the display, a first search narrowing affordance and a second search narrowing affordance.

10. The non-transitory computer-readable storage medium of claim 9, wherein the non-transitory computer-readable storage medium further comprises instructions, which when executed by the one or more processors of the electronic device, cause the device to:

receive an input corresponding to an activation of the first search narrowing affordance; and in response to receiving the input corresponding to the activation of the first search narrowing affordance, update displayed search results to only include search results associated with emails that include the person as a sender.

11. The non-transitory computer-readable storage medium of claim 1, wherein the non-transitory computer-readable storage medium further comprises instructions, which when executed by the one or more processors of the electronic device, cause the device to:

prior to initiating the search, determine that the search term matches a subject or body of one or more emails; and in response to determining that the search term matches one or more of the subject or body of one or more emails, display, on the display, one or more affordances corresponding to the one or more emails.

12. The non-transitory computer-readable storage medium of claim 1, wherein the non-transitory computer-readable storage medium further comprises instructions, which when executed by the one or more processors of the electronic device, cause the device to:

prior to initiating the search, determine that the search term matches one or more attachments of one or more emails; and in response to determining that the search term matches one or more attachments of the one or more emails, display, on the display, one or more affordances corresponding to the one or more attachments.

13. The non-transitory computer-readable storage medium of claim 1, wherein the non-transitory computer-readable storage medium further comprises instructions, which when executed by the one or more processors of the electronic device, cause the device to:

display, on the display, a first account selection affordance;

receive an input corresponding to activation of the first account selection affordance; and in response to receiving the input corresponding to activation of the first account selection affordance, expand the search results to include search results based on a plurality of email accounts.

14. The non-transitory computer-readable storage medium of claim 1, wherein:

displaying the respective search result group includes displaying a first heading that identifies the respective time period, wherein the respective time period is not a coalesced time period, and displaying the search result group that is different from the respective search result group includes displaying a second heading that identifies a coalesced time period that includes the respective time period.

15. An electronic device, comprising:

a display;

one or more processors;

memory; and one or more programs, wherein the one or more programs are stored in the memory and configured to be executed by the one or more processors, the one or more programs including instructions for:

receiving a request that includes a search term;

initiating a search based on the search term to produce a plurality of search results of a plurality of time periods, wherein time periods of the plurality of time periods do not overlap; and for each respective time period of at least two time periods of the plurality of time periods:

determining whether there are more than a predetermined number of search results for the respective time period;

in accordance with a determination that there are more than the predetermined number of search results for the respective time period, displaying, on the display, a respective search result group that includes at least some of the search results for the respective time period, wherein displaying the respective search result group includes displaying the at least some of the search results for the respective time period and not displaying a search result for a time period that is outside of the respective time period; and in accordance with a determination that there are not more than the predetermined number of search results for the respective time period, displaying, on the display, a search result group that is different from the respective search result group and that includes the search results of the respective time period, wherein displaying the search result group that is different from the respective search result group includes displaying the search results of the respective time period and the search result for the time period that is outside of the respective time period.

16. The electronic device of claim 15, wherein the search result group corresponds to a different time period than the respective time period, and wherein the different time period is a coalesced time period.

17. The electronic device of claim 15, wherein the search result group corresponds to a different time period than the respective time period, and wherein the different time period is an earlier time period.

18. The electronic device of claim 15, wherein the search result group corresponds to a different time period than the respective time period, and wherein the different time period is adjacent to the respective time period.

19. The electronic device of claim 15, wherein the plurality of time periods includes:

current day;

previous day; and since last week, not including the current day and the previous day.

20. The electronic device of claim 15, wherein the plurality of time periods includes:

current day;

previous day;

since last week, not including the current day and the previous day; and current month, not including the current day, the previous day, and since last week.

21. The electronic device of claim 15, wherein each displayed search result of the at least some of the search results is an affordance, and the one or more programs further includes instructions for:
    receiving an input corresponding to an activation of a displayed search result of the at least some of the search results; and
    in response to receiving the input corresponding to the activation of the displayed search result of the at least some of the search results, displaying, on the display, an email corresponding to the displayed search result.

22. The electronic device of claim 15, the one or more programs further including instructions for:
    prior to initiating the search, determining that the search term matches one or more persons;
    in response to determining that the search term matches one or more persons, displaying, on the display, one or more affordances corresponding to the one or more persons;
    receiving an input corresponding to an activation of a first affordance of the one or more affordances; and
    in response to receiving the input corresponding to the activation of the first affordance of the one or more affordances, initiating the search.

23. The electronic device of claim 22, the one or more programs further including instructions for:
    in response to receiving the input corresponding to the activation of the first affordance of the one or more affordances, displaying, on the display, a second affordance indicating a search based on a person associated with the first affordance;
    receiving an input corresponding to an activation of the second affordance; and
    in response to receiving the input corresponding to the activation of the second affordance, displaying, on the display, a first search narrowing affordance and a second search narrowing affordance.

24. The electronic device of claim 23, the one or more programs further including instructions for:
    receiving an input corresponding to an activation of the first search narrowing affordance; and
    in response to receiving the input corresponding to the activation of the first search narrowing affordance, updating displayed search results to only include search results associated with emails that include the person as a sender.

25. The electronic device of claim 15, the one or more programs further including instructions for:
    prior to initiating the search, determining that the search term matches a subject or body of one or more emails; and
    in response to determining that the search term matches one or more of the subject or body of one or more emails, displaying, on the display, one or more affordances corresponding to the one or more emails.

26. The electronic device of claim 15, the one or more programs further including instructions for:
    prior to initiating the search, determining that the search term matches one or more attachments of one or more emails; and
    in response to determining that the search term matches one or more attachments of the one or more emails, displaying, on the display, one or more affordances corresponding to the one or more attachments.

27. The electronic device of claim 15, the one or more programs further including instructions for:
    displaying, on the display, a first account selection affordance;
    receiving an input corresponding to activation of the first account selection affordance; and
    in response to receiving the input corresponding to activation of the first account selection affordance, expanding the search results to include search results based on a plurality of email accounts.

28. The electronic device of claim 15, wherein:
    displaying the respective search result group includes displaying a first heading that identifies the respective time period, wherein the respective time period is not a coalesced time period, and
    displaying the search result group that is different from the respective search result group includes displaying a second heading that identifies a coalesced time period that includes the respective time period.

29. A method, comprising:
    at an electronic device with a display:
        receiving a request that includes a search term;
        initiating a search based on the search term to produce a plurality of search results of a plurality of time periods, wherein time periods of the plurality of time periods do not overlap; and
        for each respective time period of at least two time periods of the plurality of time periods:
            determining whether there are more than a predetermined number of search results for the respective time period;
            in accordance with a determination that there are more than the predetermined number of search results for the respective time period, displaying, on the display, a respective search result group that includes at least some of the search results for the respective time period, wherein displaying the respective search result group includes displaying the at least some of the search results for the respective time period and not displaying a search result for a time period that is outside of the respective time period; and
            in accordance with a determination that there are not more than the predetermined number of search results for the respective time period, displaying, on the display, a search result group that is different from the respective search result group and that includes the search results of the respective time period, wherein displaying the search result group that is different from the respective search result group includes displaying the search results of the respective time period and the search result for the time period that is outside of the respective time period.

30. The method of claim 29, wherein the search result group corresponds to a different time period than the respective time period, and wherein the different time period is a coalesced time period.

31. The method of claim 29, wherein the search result group corresponds to a different time period than the respective time period, and wherein the different time period is an earlier time period.

32. The method of claim 29, wherein the search result group corresponds to a different time period than the respective time period, and wherein the different time period is adjacent to the respective time period.

33. The method of claim 29, wherein the plurality of time periods includes:
current day;
previous day; and
since last week, not including the current day and the previous day.

34. The method of claim 29, wherein the plurality of time periods includes:
current day;
previous day;
since last week, not including the current day and the previous day; and
current month, not including the current day, the previous day, and since last week.

35. The method of claim 29, wherein each displayed search result of the at least some of the search results is an affordance, and the method further comprises:
receiving an input corresponding to an activation of a displayed search result of the at least some of the search results; and
in response to receiving the input corresponding to the activation of the displayed search result of the at least some of the search results, displaying, on the display, an email corresponding to the displayed search result.

36. The method of claim 29, further comprising:
prior to initiating the search, determining that the search term matches one or more persons;
in response to determining that the search term matches one or more persons, displaying, on the display, one or more affordances corresponding to the one or more persons;
receiving an input corresponding to an activation of a first affordance of the one or more affordances; and
in response to receiving the input corresponding to the activation of the first affordance of the one or more affordances, initiating the search.

37. The method of claim 36, further comprising:
in response to receiving the input corresponding to the activation of the first affordance of the one or more affordances, displaying, on the display, a second affordance indicating a search based on a person associated with the first affordance;
receiving an input corresponding to an activation of the second affordance; and
in response to receiving the input corresponding to the activation of the second affordance, displaying, on the display, a first search narrowing affordance and a second search narrowing affordance.

38. The method of claim 37, further comprising:
receiving an input corresponding to an activation of the first search narrowing affordance; and
in response to receiving the input corresponding to the activation of the first search narrowing affordance, updating displayed search results to only include search results associated with emails that include the person as a sender.

39. The method of claim 29, further comprising:
prior to initiating the search, determining that the search term matches a subject or body of one or more emails; and
in response to determining that the search term matches one or more of the subject or body of one or more emails, displaying, on the display, one or more affordances corresponding to the one or more emails.

40. The method of claim 29, further comprising:
prior to initiating the search, determining that the search term matches one or more attachments of one or more emails; and
in response to determining that the search term matches one or more attachments of the one or more emails, displaying, on the display, one or more affordances corresponding to the one or more attachments.

41. The method of claim 29, further comprising:
displaying, on the display, a first account selection affordance;
receiving an input corresponding to activation of the first account selection affordance; and
in response to receiving the input corresponding to activation of the first account selection affordance, expanding the search results to include search results based on a plurality of email accounts.

42. The method of claim 29, wherein:
displaying the respective search result group includes displaying a first heading that identifies the respective time period, wherein the respective time period is not a coalesced time period, and
displaying the search result group that is different from the respective search result group includes displaying a second heading that identifies a coalesced time period that includes the respective time period.

* * * * *